(12) United States Patent
Yoshioka

(10) Patent No.: US 7,966,300 B2
(45) Date of Patent: Jun. 21, 2011

(54) APPLICATION PROCESSING METHOD, AND INTERMEDIATION SERVER DEVICE

(75) Inventor: Takashi Yoshioka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 420 days.

(21) Appl. No.: 12/256,894

(22) Filed: Oct. 23, 2008

(65) Prior Publication Data
US 2009/0112883 A1    Apr. 30, 2009

(30) Foreign Application Priority Data
Oct. 24, 2007    (JP) ................................ 2007-276329

(51) Int. Cl.
*G06F 17/30* (2006.01)
(52) U.S. Cl. ........................ 707/695; 707/609; 707/802
(58) Field of Classification Search .................. 707/695, 707/609, 802; 713/194, 166, 164; 705/39, 705/28; 709/201
See application file for complete search history.

(56) References Cited

U.S. PATENT DOCUMENTS

| | | | |
|---|---|---|---|
| 5,862,325 A * | 1/1999 | Reed et al. .................... 709/201 |
| 7,051,001 B1 * | 5/2006 | Slater ............................. 705/39 |
| 7,788,487 B2 * | 8/2010 | Ito et al. ......................... 713/164 |
| 2003/0023862 A1 * | 1/2003 | Yamasaki et al. .............. 713/194 |
| 2005/0105735 A1 * | 5/2005 | Iino et al. ....................... 380/277 |
| 2007/0067227 A1 * | 3/2007 | Ikeda et al. ..................... 705/28 |
| 2007/0113079 A1 * | 5/2007 | Ito et al. ......................... 713/166 |
| 2009/0024849 A1 * | 1/2009 | Nakano et al. ................. 713/175 |

FOREIGN PATENT DOCUMENTS

JP    A 2007-179362    7/2007

OTHER PUBLICATIONS

U.S. Appl. No. 11/639,348, Notice of Allowance.*

* cited by examiner

*Primary Examiner* — Sheree N. Brown
(74) *Attorney, Agent, or Firm* — Greer, Burns & Crain, Ltd.

(57) ABSTRACT

An intermediate server device is installed among a financial institution server device, a local government server device and an applicant terminal device. The intermediate server device transmits application processing information received from the applicant terminal device to the financial institution server device after adding data for verification and application ID. Partially masked application processing information is sent to the local government server device for verification. Then the intermediate server device manages verification history for certification request information with application IDs requested from the financial institution server device based on the application IDs.

6 Claims, 21 Drawing Sheets

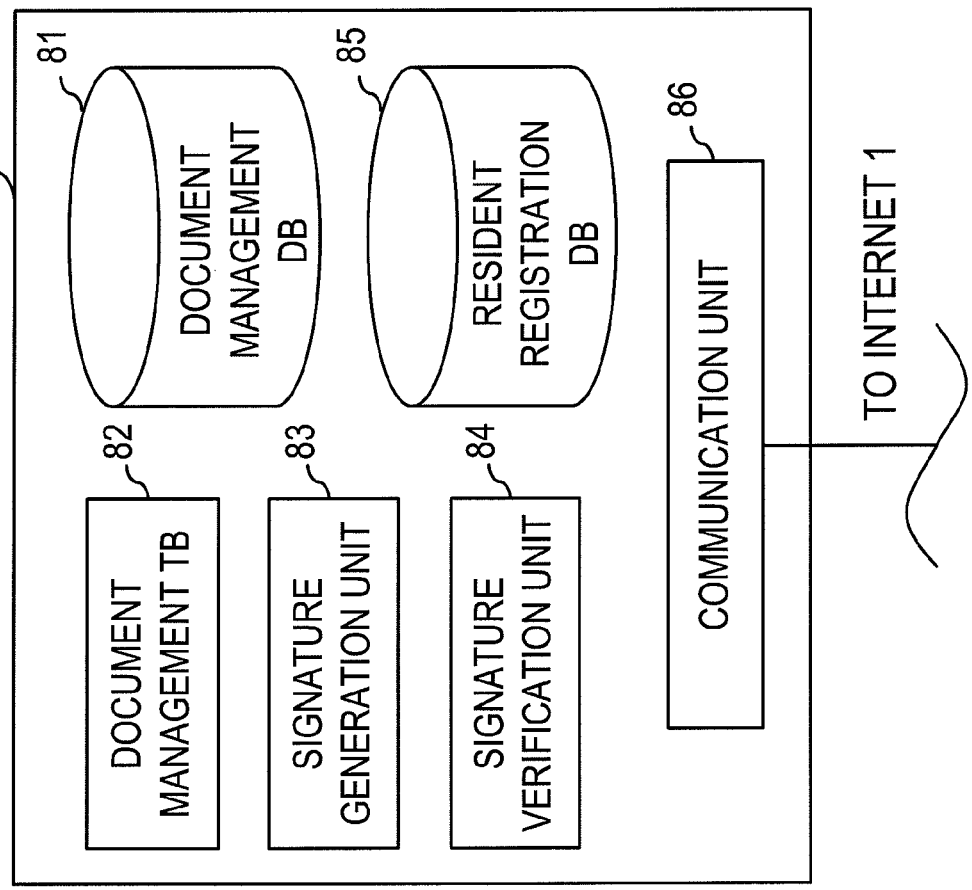
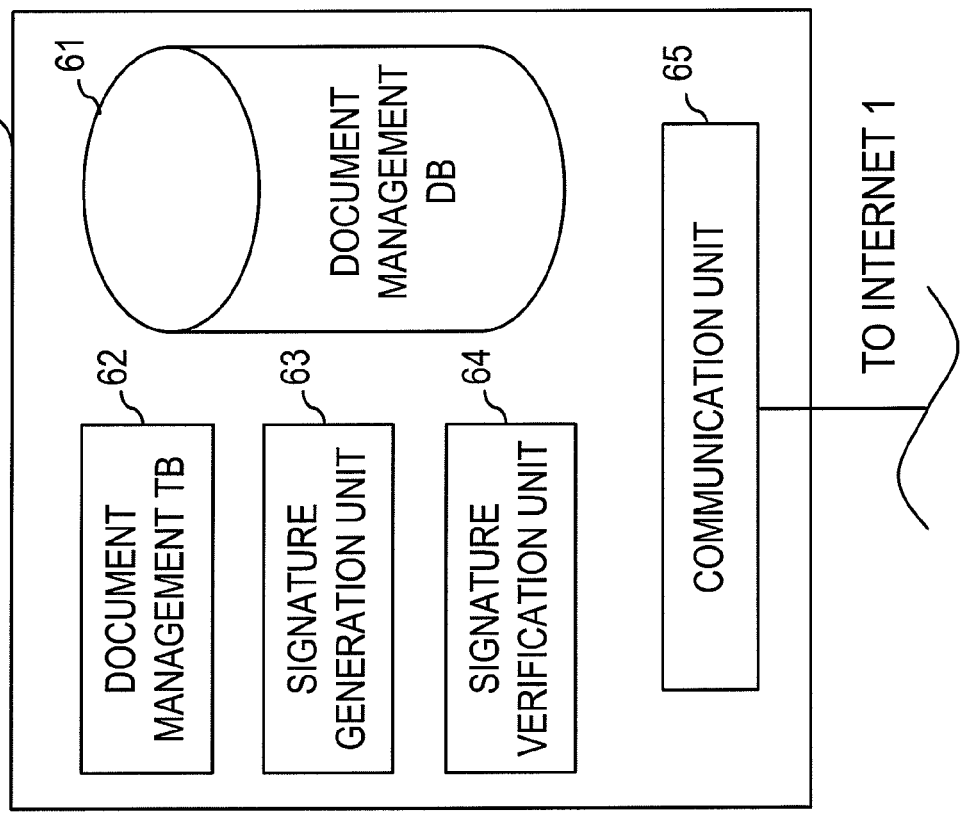

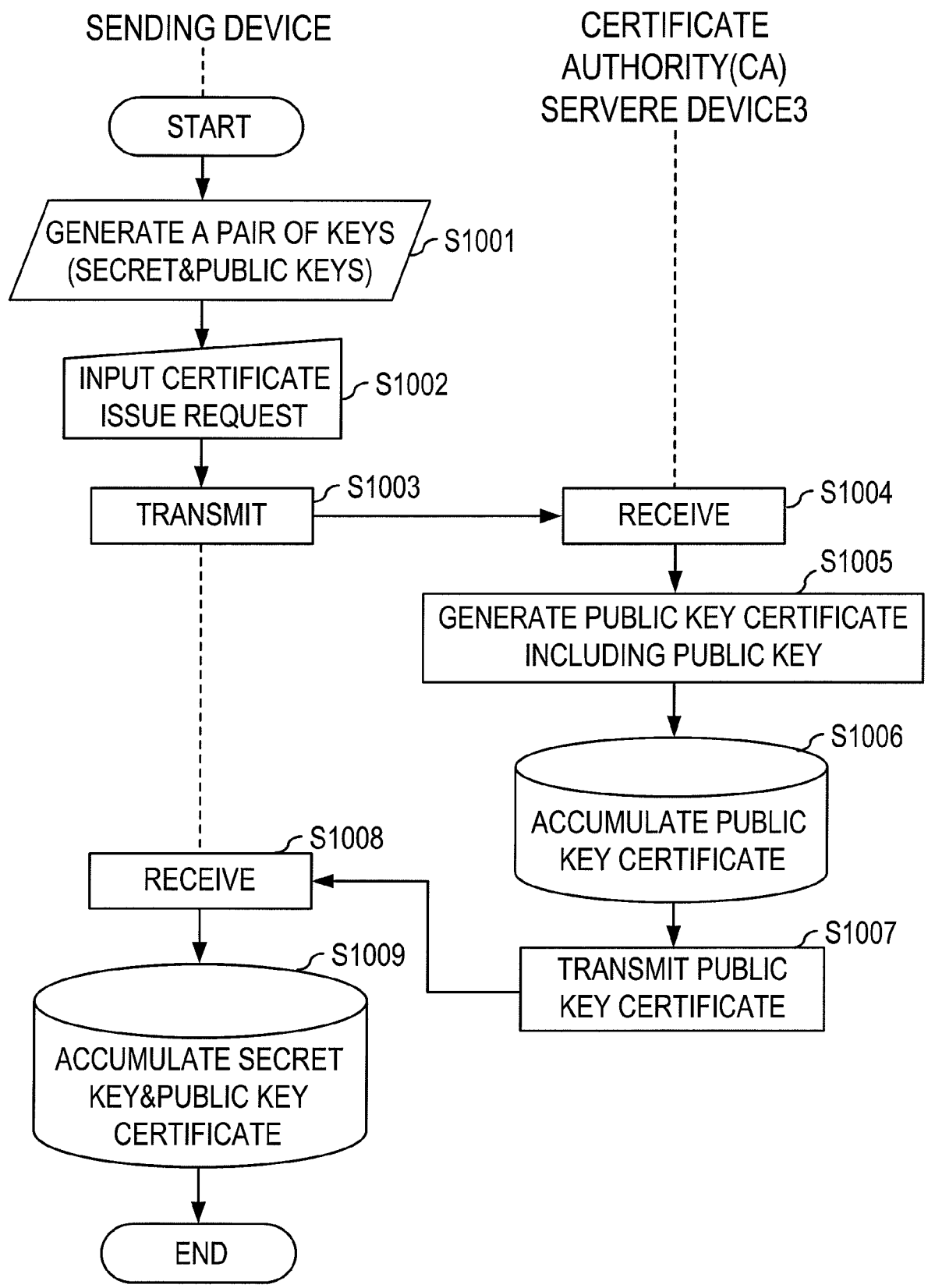

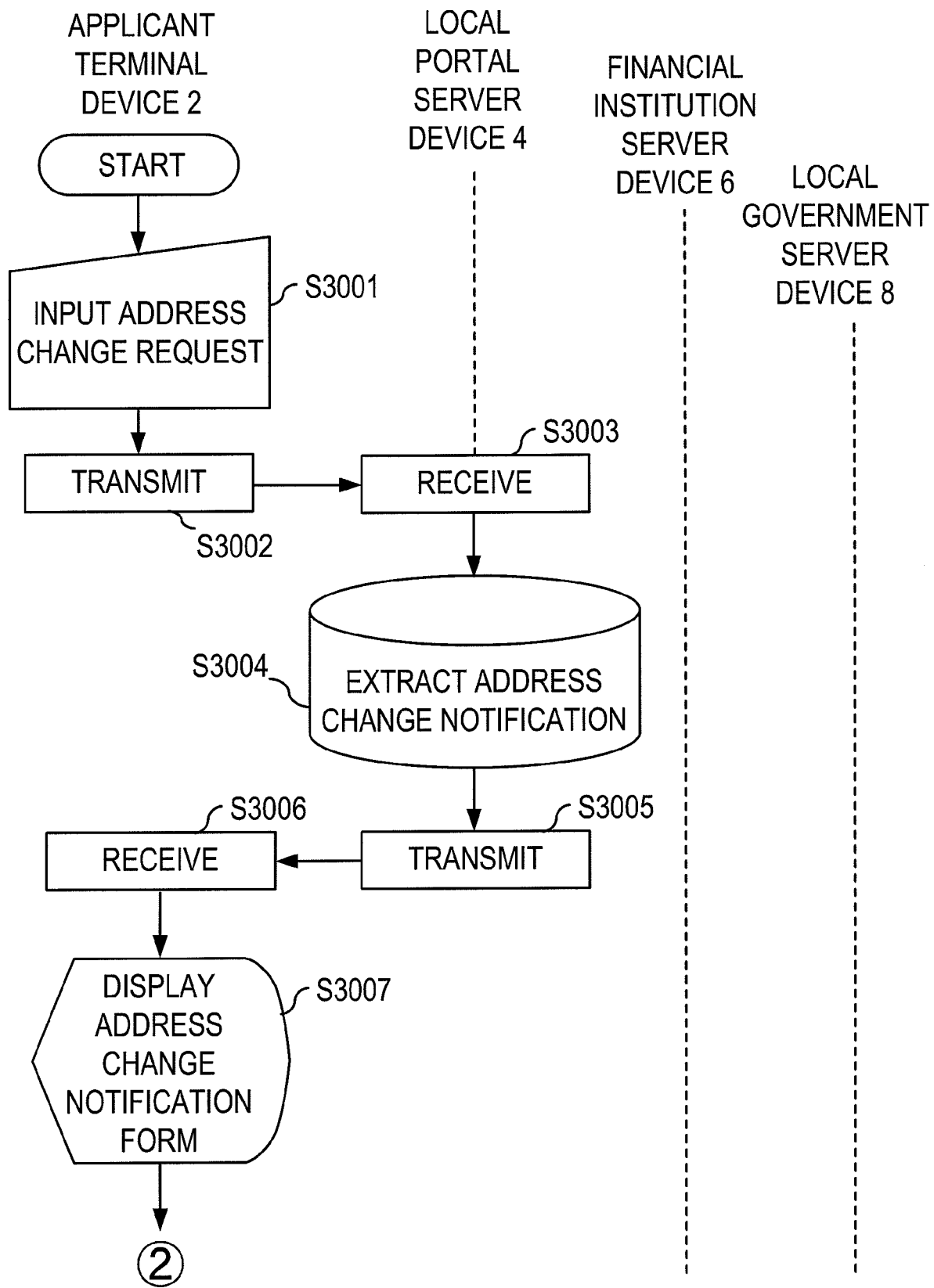

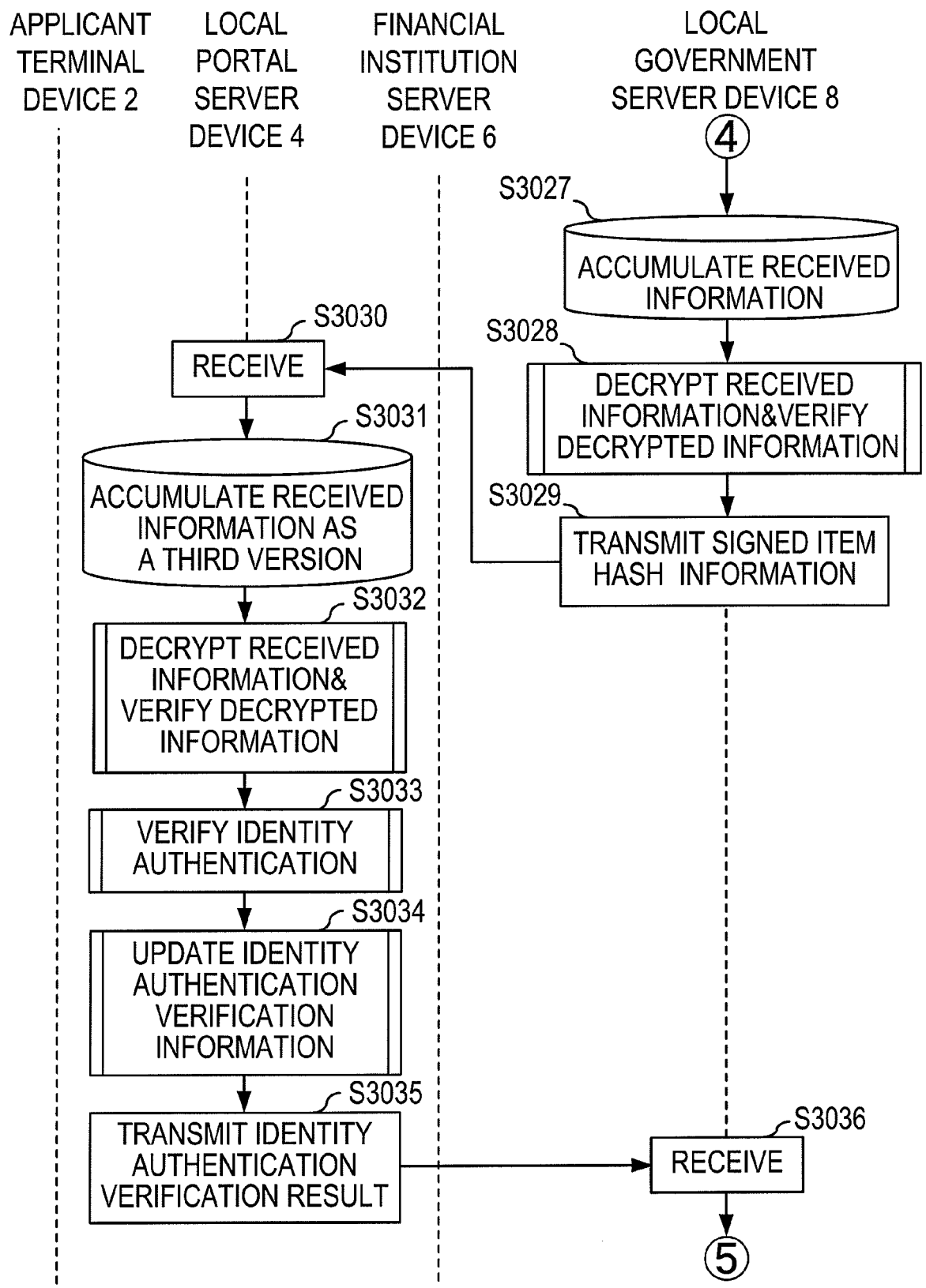

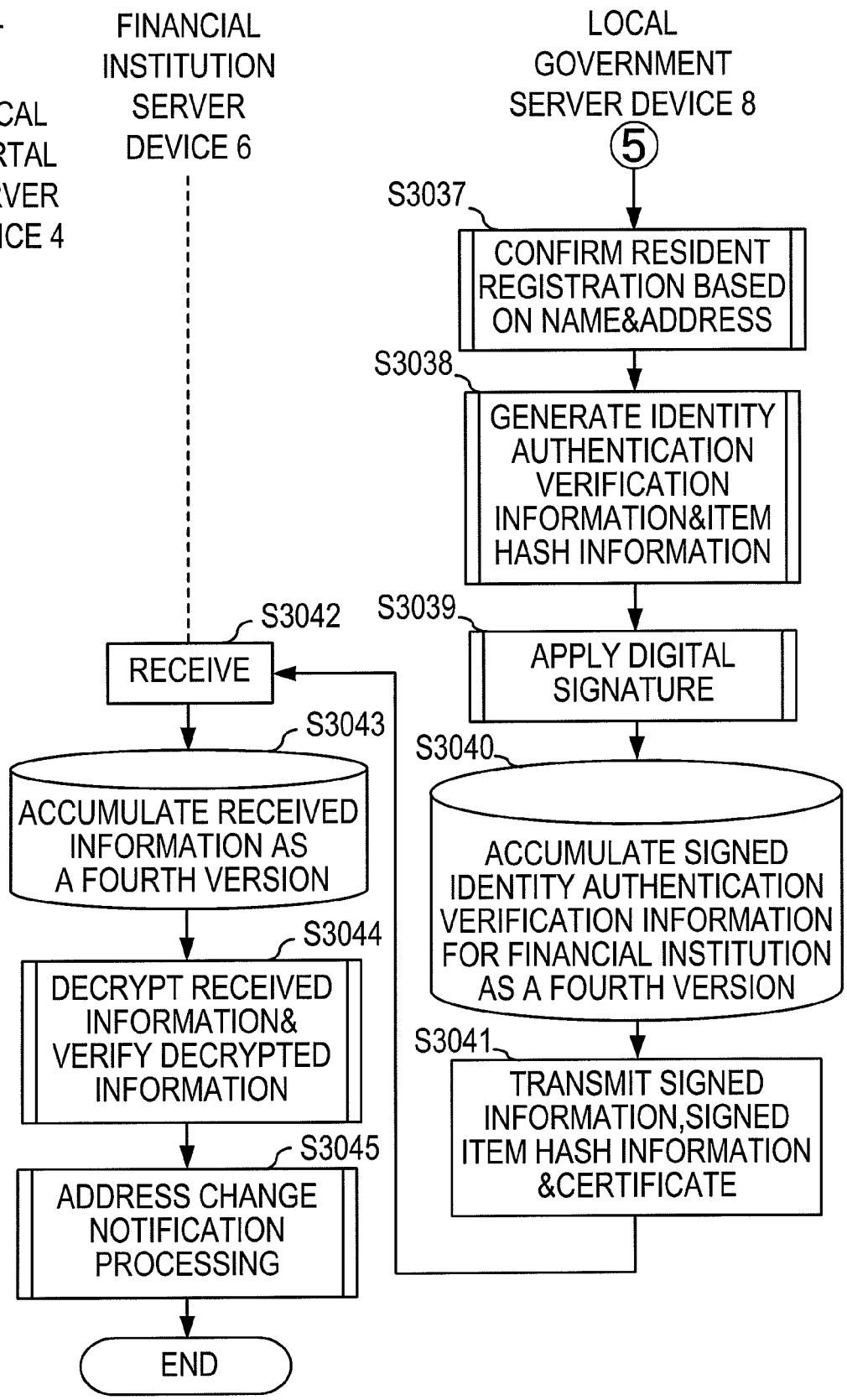

FIG. 9
A FIRST VERSION OF ADDRESS CHANGE NOTIFICATION
(a) ADDRESS CHANGE NOTIFICATION OF APPLICANT
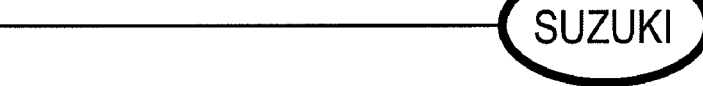
DIGITAL SIGNATURE
(b) ITEM HASH INFORMATION OF ADDRESS CHANGE NOTIFICATION OF APPLICANT
DIGITAL SIGNATURE

FIG. 11
A SECOND VERSION OF ADDRESS CHANGE NOTIFICATION
(a) ADDRESS CHANGE NOTIFICATION FOR FINANCIAL INSTITUTION
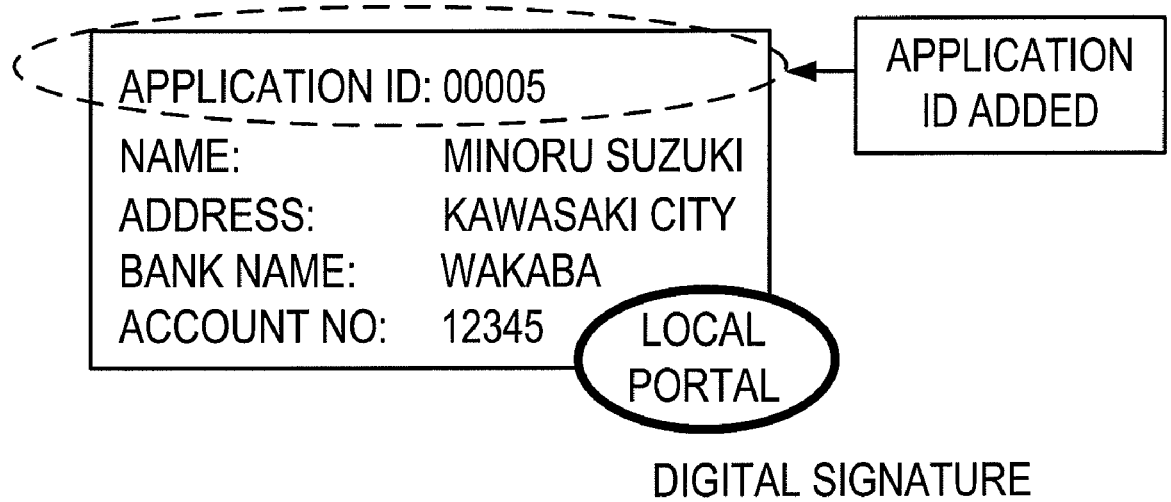
DIGITAL SIGNATURE
(b) ITEM HASH INFORMATION OF ADDRESS CHANGE NOTIFICATION FOR FINANCIAL INSTITUTION
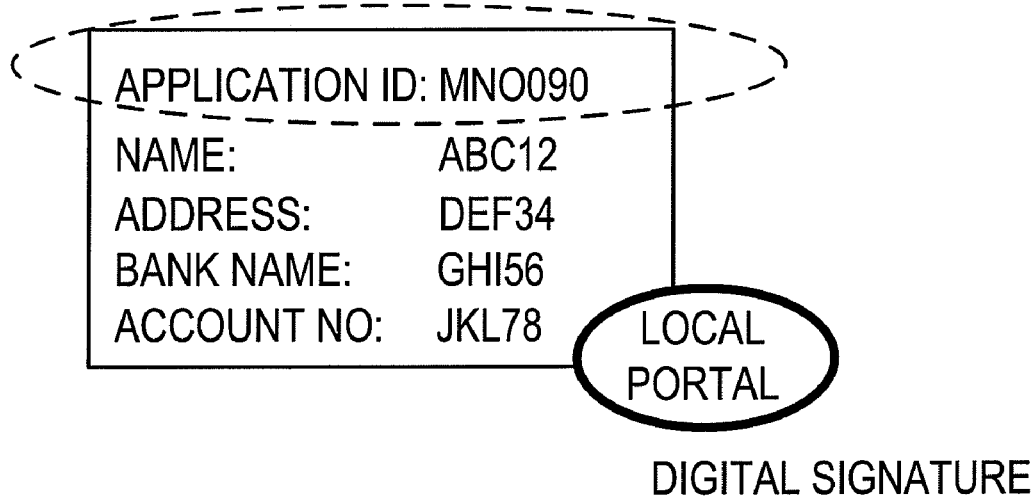
DIGITAL SIGNATURE

FIG. 12

INFORMATION TRANSMITTED TO FINANCIAL INSTITUTION (a) A SECOND VERSION OF ADDRESS CHANGE NOTIFICATION

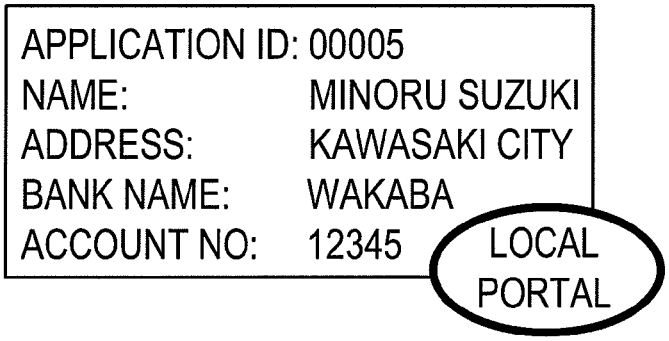

APPLICATION ID: 00005
NAME: MINORU SUZUKI
ADDRESS: KAWASAKI CITY
BANK NAME: WAKABA
ACCOUNT NO: 12345
LOCAL PORTAL (b) A SECOND VERSION OF ITEM HASH INFORMATION

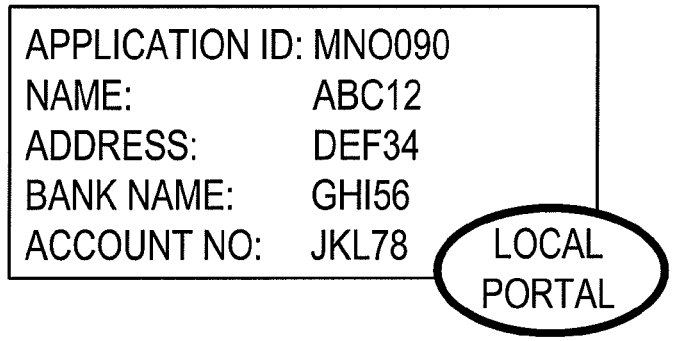

APPLICATION ID: MNO090
NAME: ABC12
ADDRESS: DEF34
BANK NAME: GHI56
ACCOUNT NO: JKL78
LOCAL PORTAL (c) A FIRST VERSION OF ITEM HASH INFORMATION

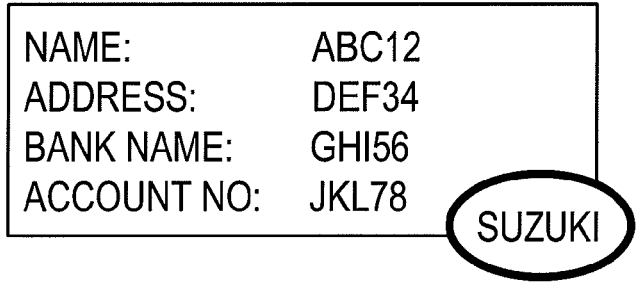

NAME: ABC12
ADDRESS: DEF34
BANK NAME: GHI56
ACCOUNT NO: JKL78
SUZUKI (d) 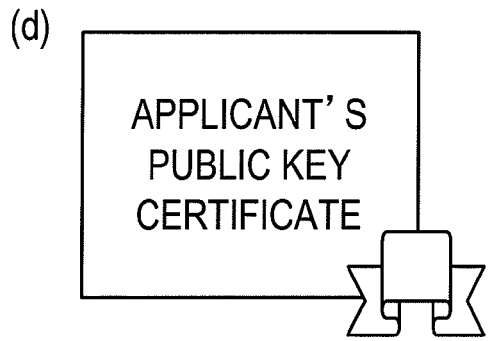

APPLICANT'S PUBLIC KEY CERTIFICATE (e) 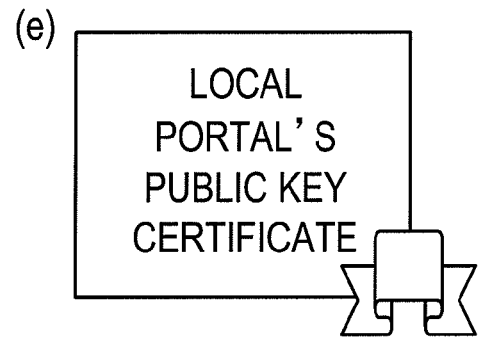

LOCAL PORTAL'S PUBLIC KEY CERTIFICATE

FIG. 13
A THIRD VERSION OF IDENTITY AUTHENTICATION REQUEST INFORMATION
(a) IDENTITY AUTHENTICATION REQUEST INFORMATION FOR LOCAL GOVERNMENT
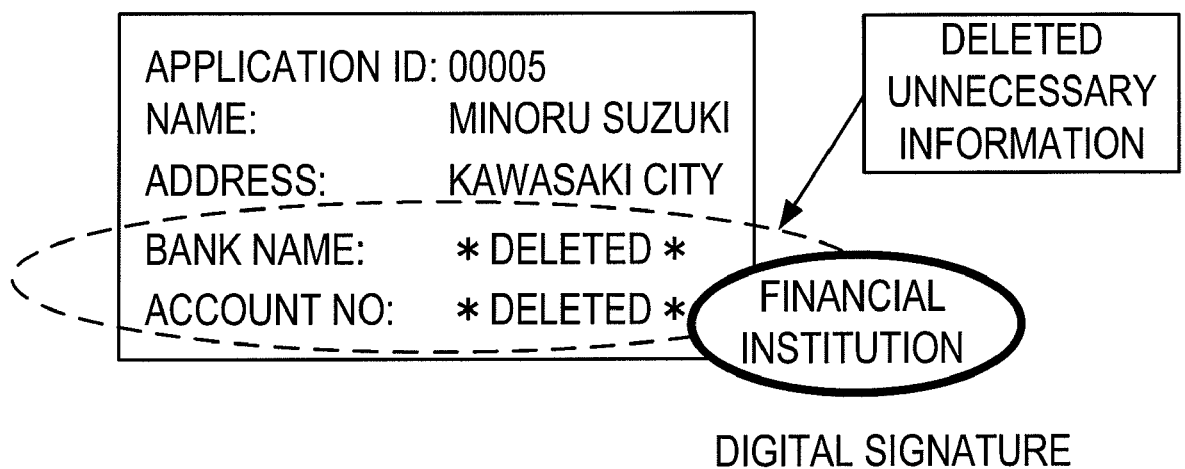
DIGITAL SIGNATURE
(b) ITEM HASH INFORMATION OF IDENTITY AUTHENTICATION REQUEST INFORMATION FOR LOCAL GOVERNMENT
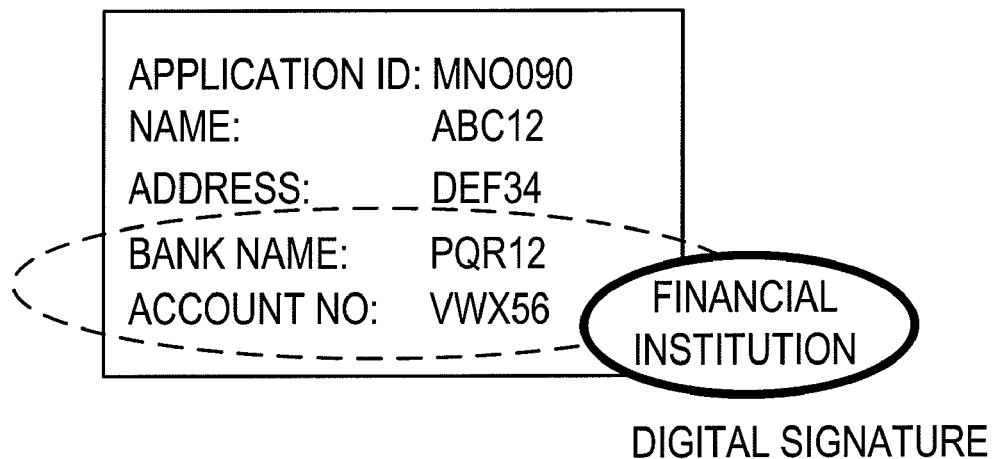
DIGITAL SIGNATURE

FIG. 14

INFORMATION TRANSMITTED TO LOCAL GOVERNMENT (a) A THIRD VERSION OF IDENTITY AUTHENTICATION REQUEST INFORMATION

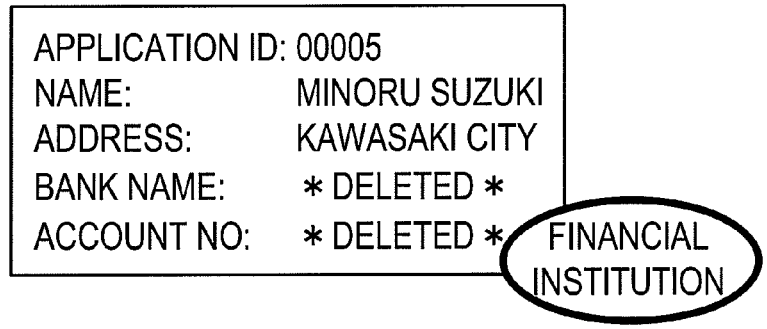

APPLICATION ID: 00005
NAME:        MINORU SUZUKI
ADDRESS:     KAWASAKI CITY
BANK NAME:   * DELETED *
ACCOUNT NO:  * DELETED *
FINANCIAL INSTITUTION (b) A THIRD VERSION OF ITEM HASH INFORMATION

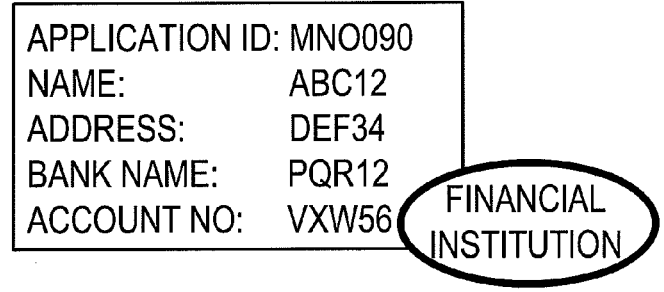

APPLICATION ID: MNO090
NAME:        ABC12
ADDRESS:     DEF34
BANK NAME:   PQR12
ACCOUNT NO:  VXW56
FINANCIAL INSTITUTION (c) A SECOND VERSION OF ITEM HASH INFORMATION

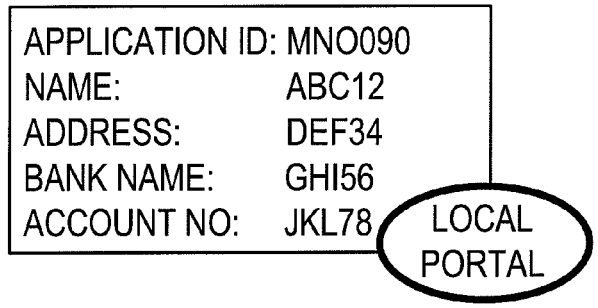

APPLICATION ID: MNO090
NAME:        ABC12
ADDRESS:     DEF34
BANK NAME:   GHI56
ACCOUNT NO:  JKL78
LOCAL PORTAL (d) A FIRST VERSION OF ITEM HASH INFORMATION

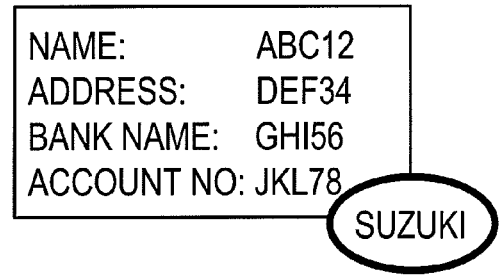

NAME:        ABC12
ADDRESS:     DEF34
BANK NAME:   GHI56
ACCOUNT NO:  JKL78
SUZUKI (e) 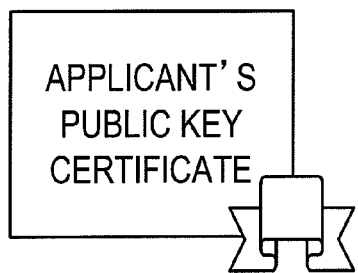
APPLICANT'S PUBLIC KEY CERTIFICATE (f) 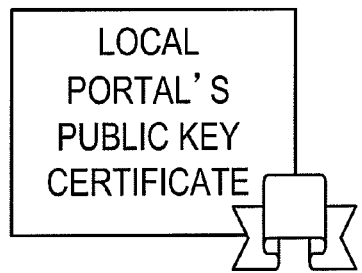
LOCAL PORTAL'S PUBLIC KEY CERTIFICATE (g) 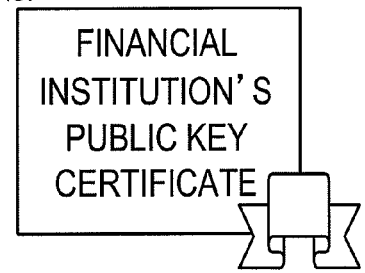
FINANCIAL INSTITUTION'S PUBLIC KEY CERTIFICATE

FIG. 15

(a) IDENTITY AUTHENTICATION VERIFICATION TB47(BEFORE UPDATE)

| APPLICANT | APPLICATION ID | PRIVATE COMPANY INFORMATION | REMARKS |
|---|---|---|---|
| KEISUKE TANAKA | 00001 | TOYOKO BANK | OPENING OF ACCOUNT |
| YASUO TAMAKI | 00002 | KANTO ELECTRIC POWER | ADDRESS CHANGE |
| HANAKO KIMURA | 00003 | HOUSING FINANCE CORP | LOAN APPLICATION |
| SHOZO ODA | 00004 | KAWASAKI BANK | ACCOUNT CHANGE |

(b) IDENTITY AUTHENTICATION VERIFICATION TB47(AFTER UPDATE)

| APPLICANT | APPLICATION ID | PRIVATE COMPANY INFORMATION | REMARKS |
|---|---|---|---|
| KEISUKE TANAKA | 00001 | TOYOKO BANK | OPENING OF ACCOUNT |
| YASUO TAMAKI | 00002 | KANTO ELECTRIC POWER | ADDRESS CHANGE |
| HANAKO KIMURA | 00003 | HOUSING FINANCE CORP | LOAN APPLICATION |
| SHOZO ODA | 00004 | KAWASAKI BANK | ACCOUNT CHANGE |
| MINORU SUZUKI | 00005 | WAKABA BANK | ADDRESS CHANGE |

ADDED ENTRY

FIG. 16
A FOURTH VERSION OF IDENTITY AUTHENTICATION VERIFICATION INFORMATION
(a) IDENTITY AUTHENTICATION VERIFICATION INFORMATION FOR FINANCIAL INSTITUTION
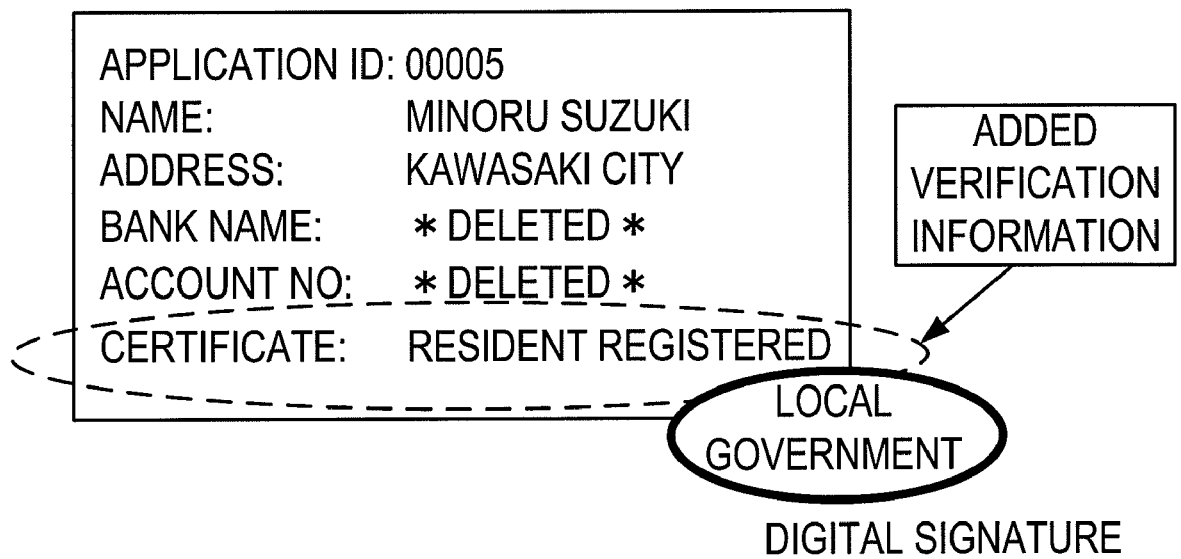
(b) ITEM HASH INFORMATION OF IDENTITY AUTHENTICATION VERIFICATION INFORMATION FOR FINANCIAL INSTITUTION
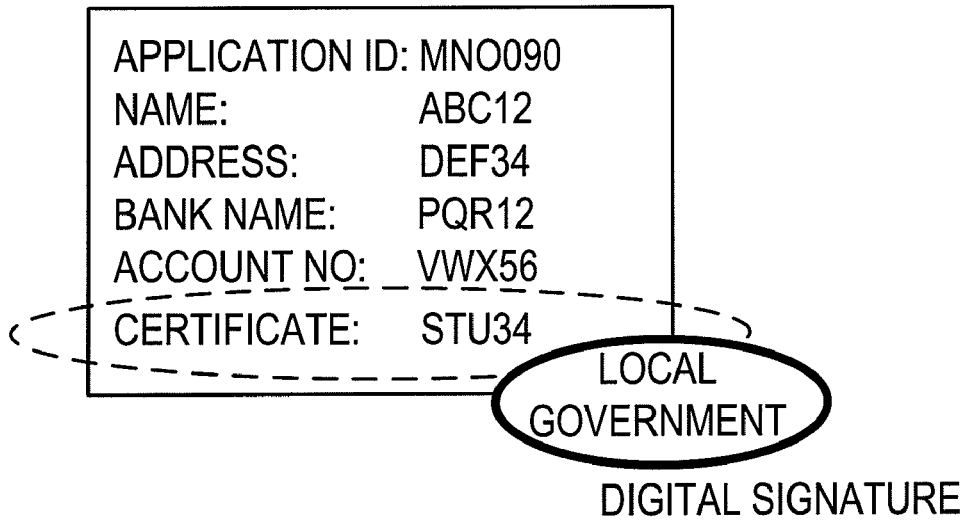

FIG. 17

INFORMATION TRANSMITTED TO FINACIAL INSTITUTION (a) A FOURTH VERSION OF IDENTITY AUTHENTICATION
VERIFICATION INFORMATION

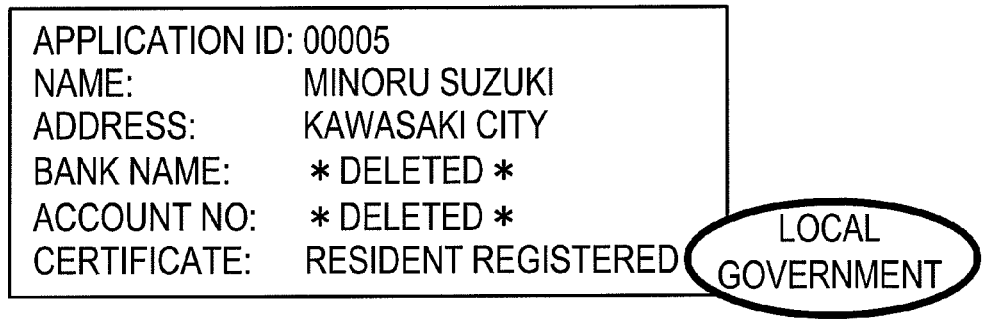

```
APPLICATION ID: 00005
NAME:          MINORU SUZUKI
ADDRESS:       KAWASAKI CITY
BANK NAME:     * DELETED *
ACCOUNT NO:    * DELETED *
CERTIFICATE:   RESIDENT REGISTERED
```
(LOCAL GOVERNMENT)

(b) A FOURTH VERSION
OF ITEM HASH
INFORMATION

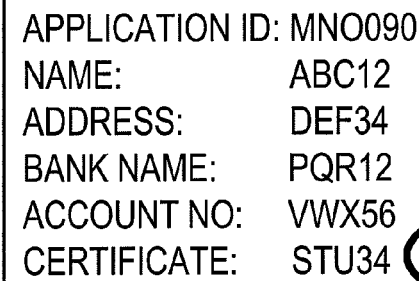

```
APPLICATION ID: MNO090
NAME:          ABC12
ADDRESS:       DEF34
BANK NAME:     PQR12
ACCOUNT NO:    VWX56
CERTIFICATE:   STU34
```
(LOCAL GOVERNMENT)

(c) A THIRD VERSION OF ITEM
HASH INFORMATION

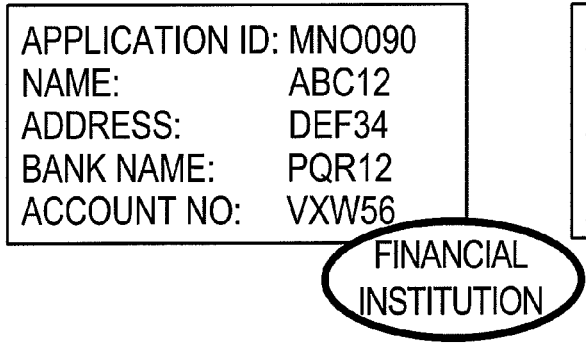

```
APPLICATION ID: MNO090
NAME:          ABC12
ADDRESS:       DEF34
BANK NAME:     PQR12
ACCOUNT NO:    VXW56
```
(FINANCIAL INSTITUTION)

(d) A SECOND VERSION OF ITEM
HASH INFORMATION

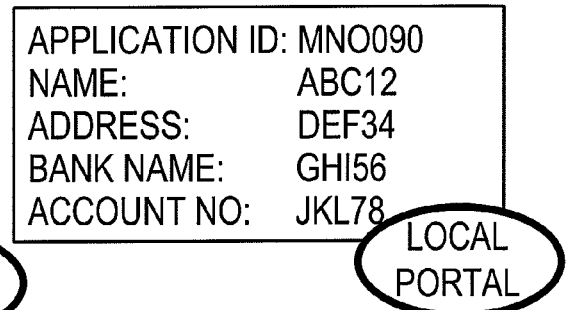

```
APPLICATION ID: MNO090
NAME:          ABC12
ADDRESS:       DEF34
BANK NAME:     GHI56
ACCOUNT NO:    JKL78
```
(LOCAL PORTAL)

(e) A FIRST VERSION OF ITEM
HASH INFORMATION

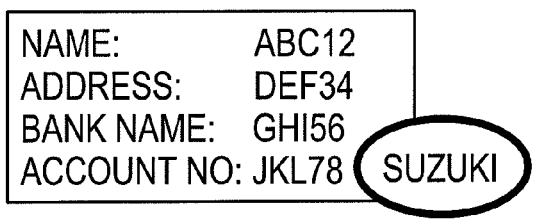

```
NAME:         ABC12
ADDRESS:      DEF34
BANK NAME:    GHI56
ACCOUNT NO:   JKL78
```
(SUZUKI)

(f)

```
LOCAL
GOVERNMENT'S
PUBLIC KEY
CERTIFICATE
```

APPLICATION PROCESSING METHOD, AND INTERMEDIATION SERVER DEVICE

CROSS-REFERENCE TO RELATED APPLICATIONS

This application is based upon and claims the benefit of priority of prior Japanese Patent Application No. 2007-276329, filed on Oct. 24, 2007, the entire contents of which are incorporated herein by reference.

FIELD

A case is assumed in which a financial institution or the like receives an application such as opening an account from an applicant, and then confirms whether the applicant really lives in the address or not the local government.

The present disclosure relates to technologies that do not allow the financial institution to make unnecessary residence confirmation, from a local government and protect a financial institution from revealing to a local government that the applicant has an account with the financial institution.

BACKGROUND

With recent explosive growth of Internet, transmitting, sharing, and exchanging information using Web sites and electronic mails have become day-to-day activities. Private companies have been promoting online services to improve customers' convenience. Such online services include Web sites that provide information on services to acquire customers, provide services, and facilitate various procedures for contractors.

Particularly, financial institutions generally provide a Web system for various applications and notifications. An applicant accesses the Web site and performs various procedures including an opening of an account, a loan application, and notification of address change.

More specifically, in the case of an address change notification, a user electronically inputs information such as the name, old address, new address, telephone number, branch name, and account number. Then pressing a confirm button transmits the address change notification to the financial institution. Thus, providing services to accept applications and such notifications on a 24 hour basis via the Web allows an applicant to perform procedures for application or notification from anywhere at anytime.

SUMMARY

An intermediate server device connectable to one of a first computer and a third computer, and a second computer. The second computer processes information data for application processing received from the first computer, and requests predetermined verification required for the application processing from the third computer via the intermediate server device. The intermediate server device performs the following processes:

receiving a first version of related information that includes a first version of information data regarding the application processing, and a first version of data for verification for verifying the first version of information data from the first computer;

storing the received information in a database;

verifying the first version of information data, and creating a second version of related information that includes a second version of information data obtained by applying an application ID to the first version of information data and a second version of data for verifying the second version of information data, and storing the second version of related information in the database;

transmitting the second version of related information data to the second computer;

verifying the application ID based on the data for verifying the application ID upon receiving the data from the third computer which received a third version of related information that includes a third version of information data and a third version of data for verification regarding a certification request of the application processing from the second computer;

transmitting the verification results to the third computer; and creating a database of verification results regarding the application IDs based on the verification results; and storing the verified data regarding to the first related information by linking the first related information to the application ID.

Additional objects and advantages of the invention (embodiment) will be set forth in part in the description which follows, and in part will be obvious from the description, or may be learned by practice of the invention. The object and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF DRAWINGS

FIG. 4 is a system configuration diagram of a financial institution server device 6 of the embodiment;

FIG. 5 is a system configuration diagram of a local government server device 8 of the embodiment;

FIG. 6 is a flow chart indicating registration processing of a public key between a sending device and Certificate Authority (CA) server device 3 of this embodiment;

FIG. 8A is a flow chart indicating processing of an address change notification of the embodiment (1 of 5);

FIG. 8D is a flow chart indicating processing of an address change notification of the embodiment (4 of 5);

FIG. 8E is a flow chart indicating processing of an address change notification of the embodiment (5 of 5);

FIG. 9 illustrates the first version of address change notification generated at the applicant terminal device 2 of the embodiment;

FIG. 11 illustrates a second version of address change notification generated at the local portal server device 4 of the embodiment;

FIG. 12 illustrates information transmitted from the local portal server device 4 to the financial institution device 6 of the embodiment;

FIG. 13 illustrates a third version of identity authentication request information generated at the financial institution server device 6 of the embodiment.

FIG. 14 illustrates information transmitted from the local portal server device 4 to the financial institution device 6 of the embodiment;

FIG. 15 illustrates identity authentication request information referred and updated at the local portal server device 4 of the embodiment;

FIG. 16 illustrates a fourth version of identity authentication request information generated at the local government server device 8 of the embodiment; and FIG. 17 illustrates information transmitted from the local government server device 8 to the financial institution device 6 in an embodiment

DESCRIPTION OF EMBODIMENTS

Preferred embodiments of the present disclosure will be described below with reference to the accompanying drawings.

Figure 1:
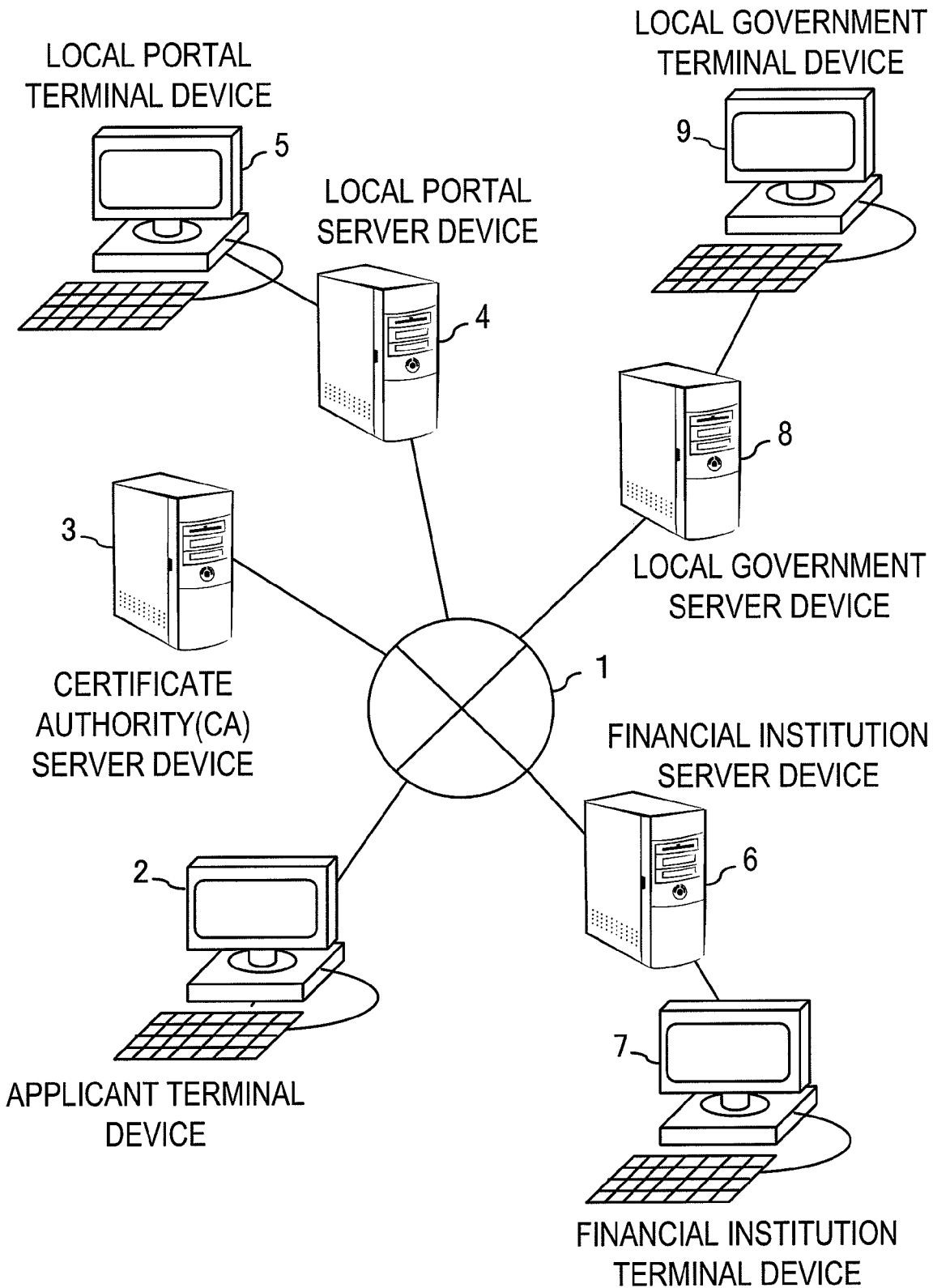
FIG. 1 is a system configuration diagram of an identity verification system of an embodiment.

First, an application processing system (i.e., an intermediate server system) of this embodiment will be described. FIG. 1 is a system configuration diagram of an application processing system of this embodiment. The application processing system shown in FIG. 1 is configured by connecting the following devices via Internet 1; an applicant terminal device (a first computer) 2, a Certificate Authority (CA) server device 3, a local portal server device (an intermediate server device) 4, a financial institution server device (a second computer) 6, and a local government server device (a third computer) 8.

An applicant owns the applicant terminal device 2 and initiates an application processing by operating the device 2, accessing the Web and inputting application information (including declaration information). Note that the Certificate Authority (CA) server 3 is a server device which manages digital signature information.

As is known, in digital signature technology, the following are sent to a communication partner: signature information obtained by encrypting digested information of the signature object information (digesting message) using the sender's secret key, signature object information, and a public key certificate. Then the receiver first confirms a validity of the public key certificate, and then compares decrypted information obtained by using the public key included in the public key certificate with the digested information acquired from the signature object information. In this technology, the authenticity of the communication partner is judged by whether the comparison shows the two pieces of information are identical.

In this digital signature technology, validity of a certificate needs to be guaranteed; therefore as in this embodiment, a Certificate Authority (CA) server device 3 which accumulates public keys of users is generally provided.

Figure 2:
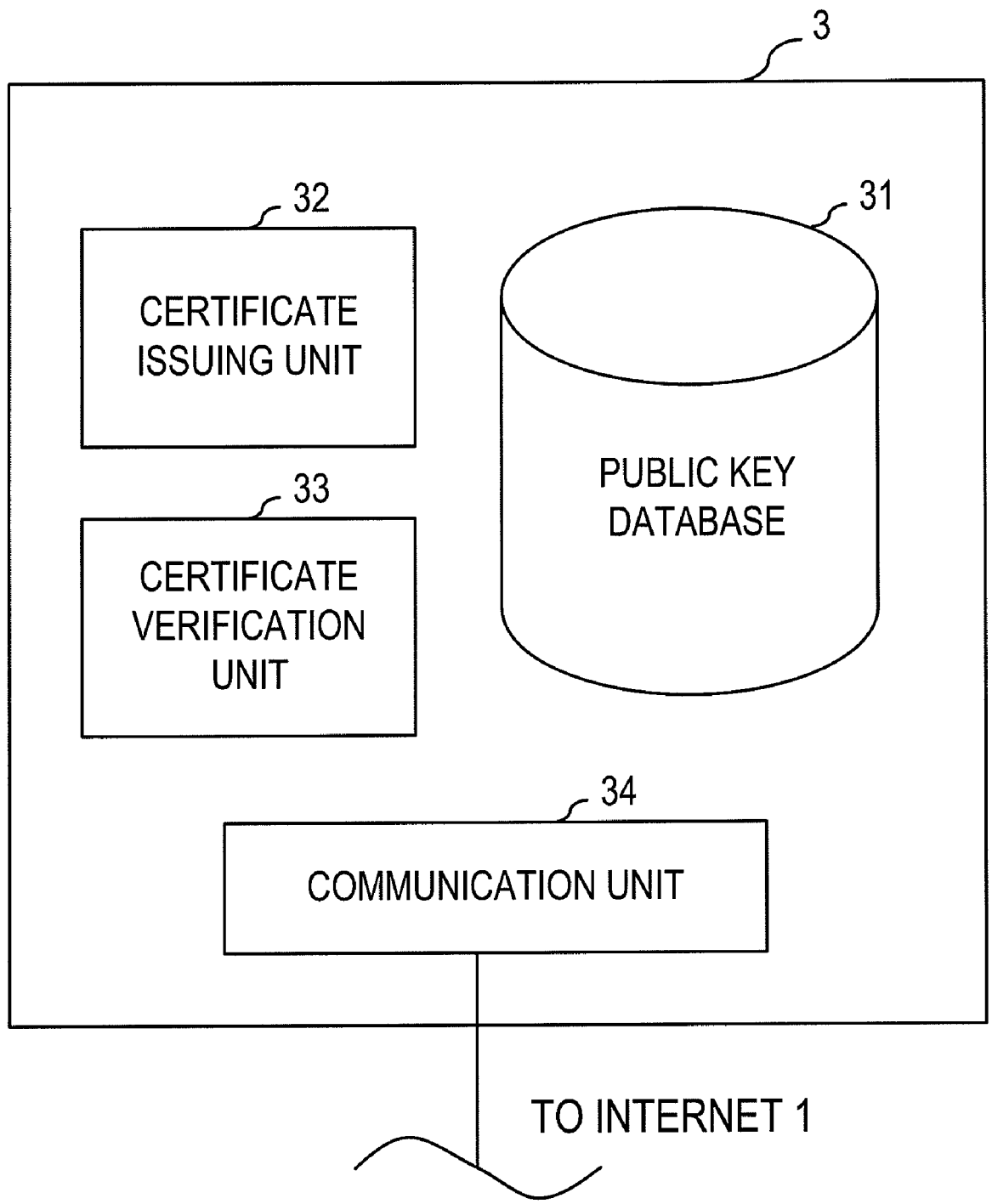
FIG. 2 is a system configuration diagram of a Certificate Authority (CA) server device 3 of the embodiment.

As shown in FIG. 2, the Certificate Authority (CA) server 3 includes a public key database (DB) 31, a certificate issuing unit 32, a certificate verification unit 33, and a communication unit 34. The DB 31 accumulates public keys of users. The unit 32 issues a public key certificate in response to a request. The verification unit 33 verifies a public key certificate. The communication unit 34 performs communication via an internet 1.

Figure 3:
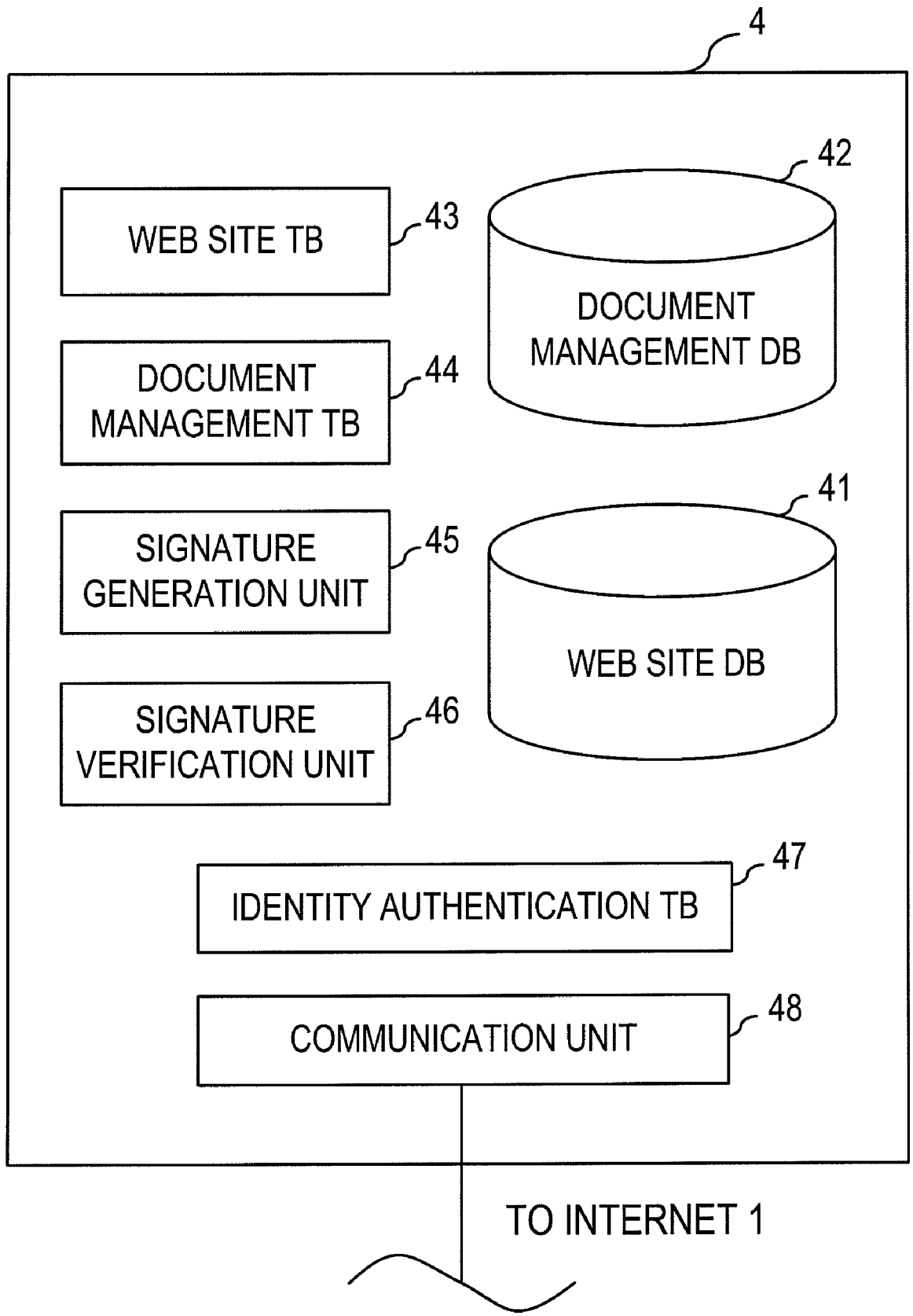
FIG. 3 is a system configuration diagram of a local portal server device 4 of the embodiment.

A local portal server device 4 is a server device at which a local portal service provider performs processing. As seen in FIG. 3, the server device 4 includes a Web site DB41, a document management DB42, and a Web site TB43. The Web site DB 41 accumulates data of each page displayed on a Web site. The DB 42 accumulates application information sent from the applicant terminal device 2 (including declaration information) and information sent and received between the financial institution server device 6, and the local government server device 8. The Web site TB 43 controls outputs of Web site information using information in the Web site DB41.

A local portal server device 4 includes a document management TB 44, a signature generation unit 45, a signature verification unit 46, an identity authentication verification TB 47, and a communication unit 48. The TB44 controls access to a document management DB 41. The signature generation unit 45 applies a digital signature of the local portal server device to information that should be signed. The TB 47 checks residence (checks history of verification result regarding an application ID). The communication unit 48 performs communication via an Internet 1.

A local portal terminal device 5 can communicate with the local portal server device 4. The terminal device 5 is operated by a person in charge in a local portal service provider for manipulating a local portal server device 4.

As shown in FIG. 4, a financial institution server device 6 includes a document management DB 61, a document management TB 62, a signature generation unit 63, a signature verification unit 64, and a communication unit 65. The DB 61 accumulates various kinds of information. The TB 62 controls access to a document management DB 61. The signature generation unit 63 applies a signature of a financial institution to information that should be signed. The signature verification unit 64 verifies a digital signature attached to the transmitted information. The communication unit 65 performs communication via the Internet.

A financial institution terminal device 7 is a terminal device operated by a person in charge in a financial institution for manipulating a financial institution server device 6.

A local government server device 8 is a server device residing in each municipality for performing identity authentication and verification of an applicant. As shown in FIG. 5, the server device 8 includes a document management DB 81, a document management TB 82, a signature generation unit 83, a signature verification unit 84, a resident registration DB 85 and a communication unit 86. The DB 81 accumulates various kinds of information. The TB 82 controls access to the document management DB 81. The signature generation unit 83 applies a signature of a local government to information that should be signed. The signature verification unit 84 verifies a digital signature attached to the transmitted information. The DB85 accumulates resident registration information. The communication unit 86 performs communication via the Internet.

A local government terminal device 9 is a terminal device operated by a person in charge in a local government for manipulating a local government server device 8.

Now, processing operations of the application processing system configured as above will be explained.

Before explaining application processing in the application processing system according to this embodiment, processing of a digital signature in each device of this embodiment will be explained.

In digital signature technology, a sender (a sending device) generates a pair of keys (a secret key and a public key) beforehand, and transmits the public key to a CA server device 3. Then the CA server issues a public key certificate. The sending device stores the secret key and the public key certificate.

When the sending device transmits information, digested information (message digest) of information to be signed is generated, and then the digested information is encrypted using the sender's secret key. The encrypted information becomes signature information.

Subsequently, the sending device transmits the signature object information, the signature information, and the sender's public key certificate to a communication partner. The communication partner (the recipient) which received such information requests the CA server device 3 for validity verification of the acquired public key certificate of the sender. If the verification reveals that the certificate is valid, the signature information is decrypted using the public key. Then the digest of the signature object information is generated and compared with the decrypted information. If the two pieces of information are the same, the transmitted information is authenticated as having been sent by the sender and not been modified.

The digest information here can be the Hash information calculated by applying a cryptographic one-way hash function to signature object information and is called "a message digest" in the sense that the size of the information subject to signature can be compressed. The hash information generated by a cryptographic one-way hash function is the only information that is uniquely generated from the signature object information and is characterized in that the original information can not be restored from the generated Hash information. Thus, the hash function is often used for encrypting information and generating a digital signature. Algorithms such as MD5, SHA-1, and SHA-256 are known for this cryptographic one-way hash function. Information on which such an algorithm has been used (i.e., hash information generation algorithm) is described in a public key certificate.

Now, detailed procedures for generating the above digital signature will be explained.

First, registration of a public key between a sending device and a Certificate Authority (CA) server device 3 is described by referring to FIG. 6.

In the system configuration shown in FIG. 1, an applicant terminal device 2, a local portal server device 4, a financial institution server device 6, and a local government server device 8 all function as sending devices for digital signatures. In the procedures of digital signatures, an operator can directly operate the applicant terminal device 2. The same procedures are applied to a local portal server device 4, a financial institution server device 6, and a local government server device 8, other than that these are operated by way of a local portal terminal device 5, a financial institution terminal device 7, and a local government terminal device 9 respectively. Therefore, these devices are collectively called sending devices in this procedure and are explained as such.

First, the sending device generates a pair of keys (a secret key and a public key) based on a sender's operation (S1001). Subsequently, the sender inputs information on a certificate issue request (S1002), the sending device transmits the information on a certificate issue request together with the public key to the CA server device 3 (S1003).

When a certificate issue unit 32 of the Certificate Authority (CA) server device 3 receives the information through a communication unit 34 (S1004), it generates a public key certificate including a public key (S1005), and accumulates public key issue certificates in a public key DB 31 (S1006).

Then the unit 32 controls the communication unit 34, and transmits the issued public key certificate to the sending device which transmitted the information via the Internet 1 (S1007).

When the sending device receives the information (S1008), it accumulates secret keys generated at S1001 and public key certificates issued by the CA server 3 in its own storage device (S1009), thereby completing the processing (Such storage devices for each unit are as follows: the storage area in a signature generation unit 45 for the local portal server device 4, a storage area within a signature generation unit 63 for the financial institution server device 6, a storage area within a signature generation unit 83 for the local government server device 8, and an area for the applicant terminal device 2 respectively).

Figure 7A:
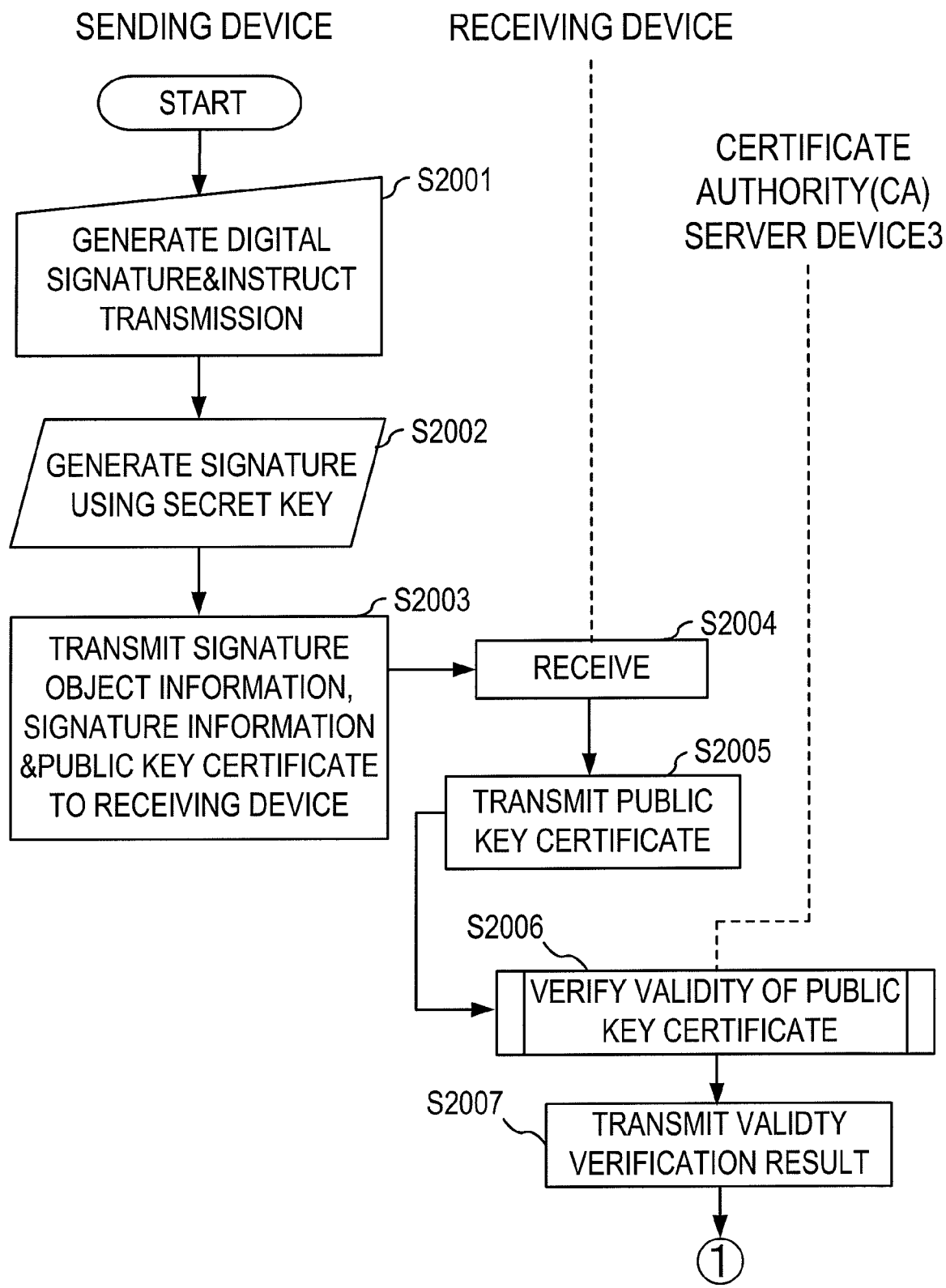
FIG. 7A is a flow chart indicating sending and receiving information with a digital signature and the verification process by the receiving device (1 of 2)
Figure 7B:
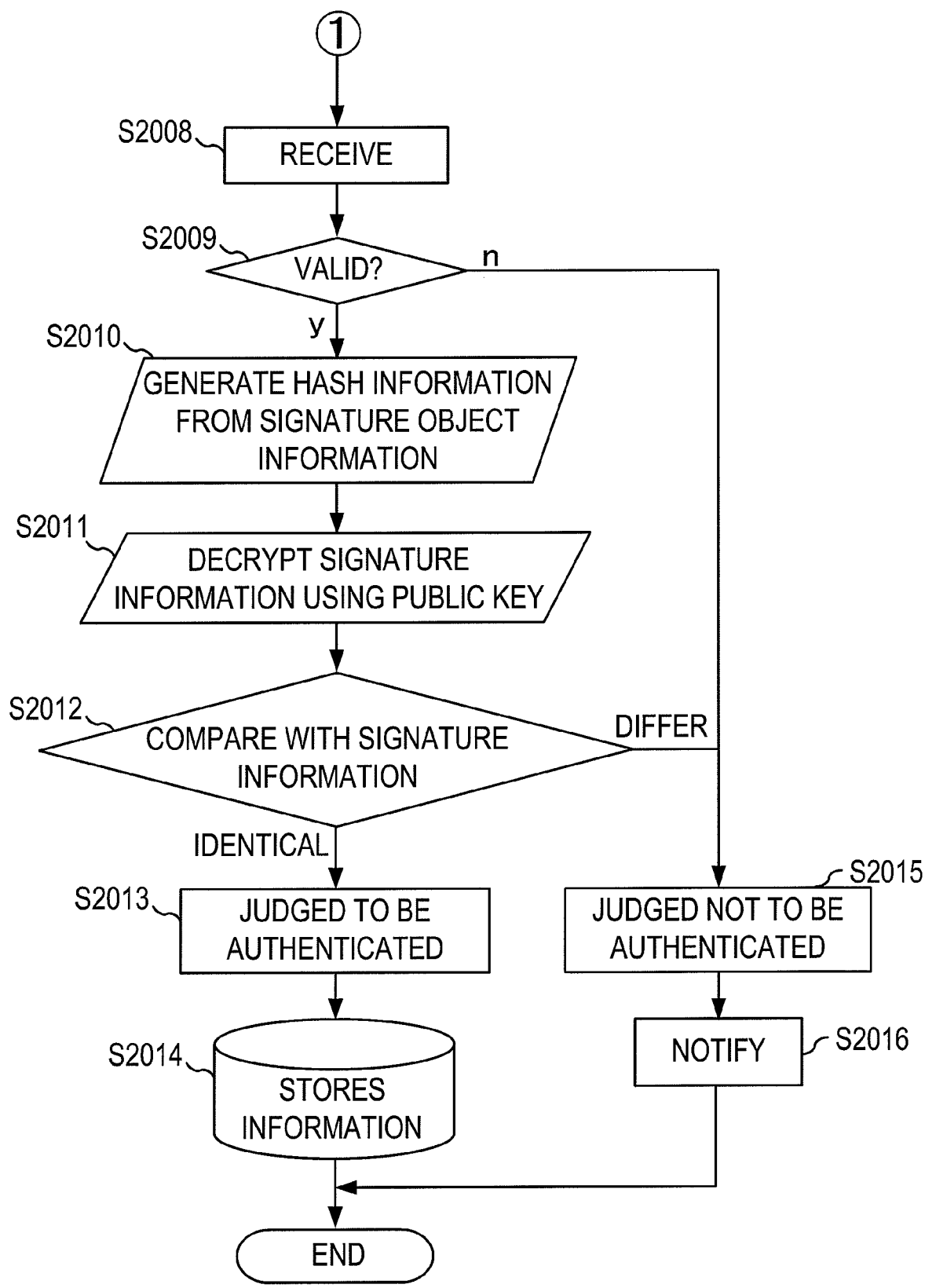
FIG. 7B is a flow chart indicating sending and receiving information with a digital signature and the verification process by the receiving device (2 of 2)

Next, processing of sending and receiving information with a digital signature is explained by referring to FIG. 7A, and FIG. 7B.

The applicant terminal device 2, the local portal server device 4, the financial institution server device 6, and the local government server device 8 all can function as receiving devices of digital signatures. Thus, for the convenience of explanation, the device that actually transmits data is regarded as the sending device, and the device which receives the information thereof is regarded as the receiving device.

First, a sender generates a digital signature for signature object information and inputs an instruction for the transmission to the receiving device (S2001). Then, the sending device encrypts the digested information of the signature object information (Hash information) as instructed using a secret key stored in the storage area (S2002), and transmits the signature object information together with the public key certificate stored in the storage area of the sending device to the receiving device (S2003).

When the receiving device receives such information (S2004), first, transmits the public key certificate to the CA server device 3 in order to confirm an expiration date, expiration information, etc (S2005). Here, the CA server device 3 is assumed to support a series of functions for issuing certificates and verifying the certificates.

Then, the CA server device 3 verifies validity of the received public key certificate (S2006), and transmits the validity verification result to the receiving device (S2007). The receiving device receives the validity verification result (S2008), and confirms whether it is valid or not (S2009).

If the receiving device confirms the validity, it refers to a generation algorithm of Hash information included in the sender's public key certificate acquired from the sending device, and generates Hash information from the signature object information received from the sending device (S2010).

Subsequently, the receiving device decrypts the signature information received from the sending device using the public key included in the public key certificate (S2011). The receiving device compares the Hash information generated at S2010 with the information obtained by decryption processing at S2011 and judges whether the two are identical or not (S2012). When the judgment reveals that the information is identical, the information is authenticated to be sent from the sending device (the sender) and no modification is made (S2013). Then the receiving device stores such information (S2014).

If the Hash information generated at S2010 and the information obtained at decryption processing S2011 is different, the receiving device judges that such information cannot be authenticated to be sent from the sending device or a sender (or was modified during the communication) (S2015), and performs notification processing such as displaying information that the information is not authenticated to be sent from the sender (S2016).

When the validity of the public key certificate is not confirmed at the processing S2009, the receiving device judges that the information is not authenticated to be sent from the sending device (sender) (S2015), and performs notification processing such as displaying that the information is not authenticated (S2016).

Now, an application processing of a system according to this embodiment will be explained. For processing of a digital signature here, each device performs the above procedures for digital signature.

First Embodiment

In a first embodiment, it is assumed that an applicant moves to a new address, and makes an address change notification to a financial institution. The embodiment is explained based on the following assumptions: the applicant can login to a local portal server device 4 using authentication information (an ID and a password) obtained beforehand by preregistration and the applicant has already registered the new residence to the local government and the new residence has been recorded in a resident registration DB 85 of a local government server device 8.

In the first embodiment, the following communication path is assumed: applicant -> local portal server device 4 -> a financial institution server device 6 -> local government server device 8 -> local portal server device 4 -> local government server device 8 -> a financial institution server device 6. It is assumed that the financial institution server device 6 directly confirms identity authentication to the local government server device 8.

This embodiment is explained based on the following assumption: the local portal server device 4 mediates the processing of the application by the applicant (notification processing and an address change notification is used as an example for this embodiment), the applicant trusts the server device 4, and leaves entire processing of the address change notification to the server device 4.

Firstly, in a flow chart of FIG. 8A, the applicant inputs an address change request for the financial institution to the applicant terminal device 2 (S3001), and the device 2 transmits the information on the address change request to the local portal server device 4 (S3002). A Web site TB 45 of the local portal server device 4 receives this information via the communication unit 48 (S3003), accesses the Web site DB41 and extracts an address change notification form (S3004), and transmits the form to the device 2 (S3005).

The applicant terminal device 2 which received this information (S3006) displays the form (S3007). The applicant sees the form and inputs the personal information such as the name and the new address (FIG. 8B: S3008). Then the applicant terminal device 2 generates Hash information for each item of address change notification, for example, by using a one-way Hash function (S3009). Subsequently the device 2 applies a digital signature to the entire personal information (a first version of information data). The device 2 generates the digital signature for the entire Hash information of each of the items (a first version of verification data) acquired at S3009 (S3010). Here the digital signature is generated according to the above process.

In this embodiment 1, as personal information of the applicant (a first version of information data), "name", "address", "bank name", and "account number" are input as shown in FIG. 9(a) by above procedure. Then the Hash information corresponding to each of item (hereunder, described as "item Hash information") is acquired (the first version of data for verification) and a digital signature of the applicant, Mr. Suzuki, is applied to the entire information comprised of these items.

The device 2 transmits the personal information with the digital signature applied together and the item Hash information, and the applicant's public key certificate in pairs as information on the address change notification (a first version of related information) to the local portal server device 4 (S3011).

When a document management TB44 of the local portal server device 4 receives such information via communication unit 48 (S3012), it accumulates the received information on address change notification in pairs (a first version of address change notification) to the document management DB42 (S3013).

The document management TB44 of the local portal server device 4 instructs a signature verification unit 46 to verify digital signatures of the accumulated address change notifications (S3014). As above, the verification of digital signature is performed in order to verify that the transmitted information was sent from the communication partner, i.e., the applicant. Note that the verification of digital signature is performed according to the above procedure.

If the verification succeeds, the personal information is verified to be sent from the valid partner, and decrypted personal information and Hash information is acquired. When the decryption succeeds, Hash information for each item of the decrypted first version of personal information is further acquired. Then the acquired Hash information is compared with the first version of item Hash information and whether the two are identical or not is verified.

Thus, it can be verified that the transmitted item Hash information and the personal information are the valid pair. If the information could not be decrypted with the processing, or the comparison between acquired Hash information for each item of the decrypted first version of personal information and the first version of item Hash information revealed the two are different, the document management TB 44 notifies of the local portal terminal device 5 of the error and interrupts the processing. The device 5 notifies the error, for example, by displaying the error information to the local portal service provider.

Subsequently, the TB44 generates information on address change notification for a financial institution based on the decrypted personal information (S3015).

Figure 10:
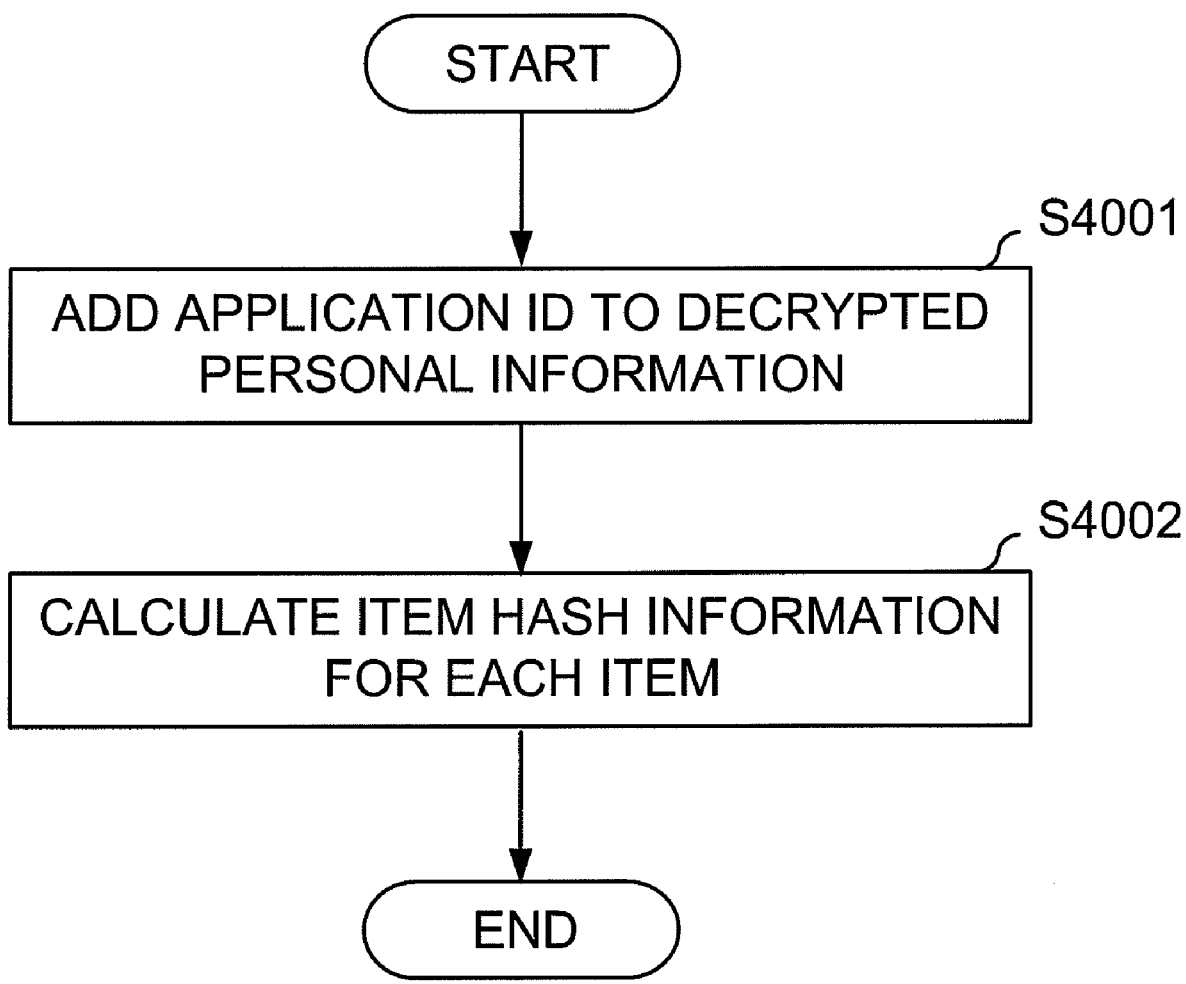
FIG. 10 is a flow chart illustrating a processing of creating an address change notification for a financial institution at a local portal server device 4 of the embodiment.

The processing will be explained using the flow chart shown in FIG. 10. The document management TB 44 adds an item of the application ID=00005 to the decrypted personal information (S4001). The application ID is added so that the local portal server device 4 identifies this is the first identity authentication of this address change notification when the financial institution requests identity authentication from the local government.

In other words, the application ID is added to prevent financial institutions from requesting residence confirmation by the local government repeatedly. The application ID is used so that the applicant can check later to see that unnecessary residence confirmation has not been made. The ID is also used to prevent one financial institution from repeatedly requesting residence confirmation. This ID is managed by the identity authentication verification TB 47 of the local portal server device 4. An arbitrary number which does not overlap with other applications and notification information is assigned to the ID. Then the document management TB44 acquires Hash information for each item of personal information modified at S4001 (S4002).

Figure 8B:
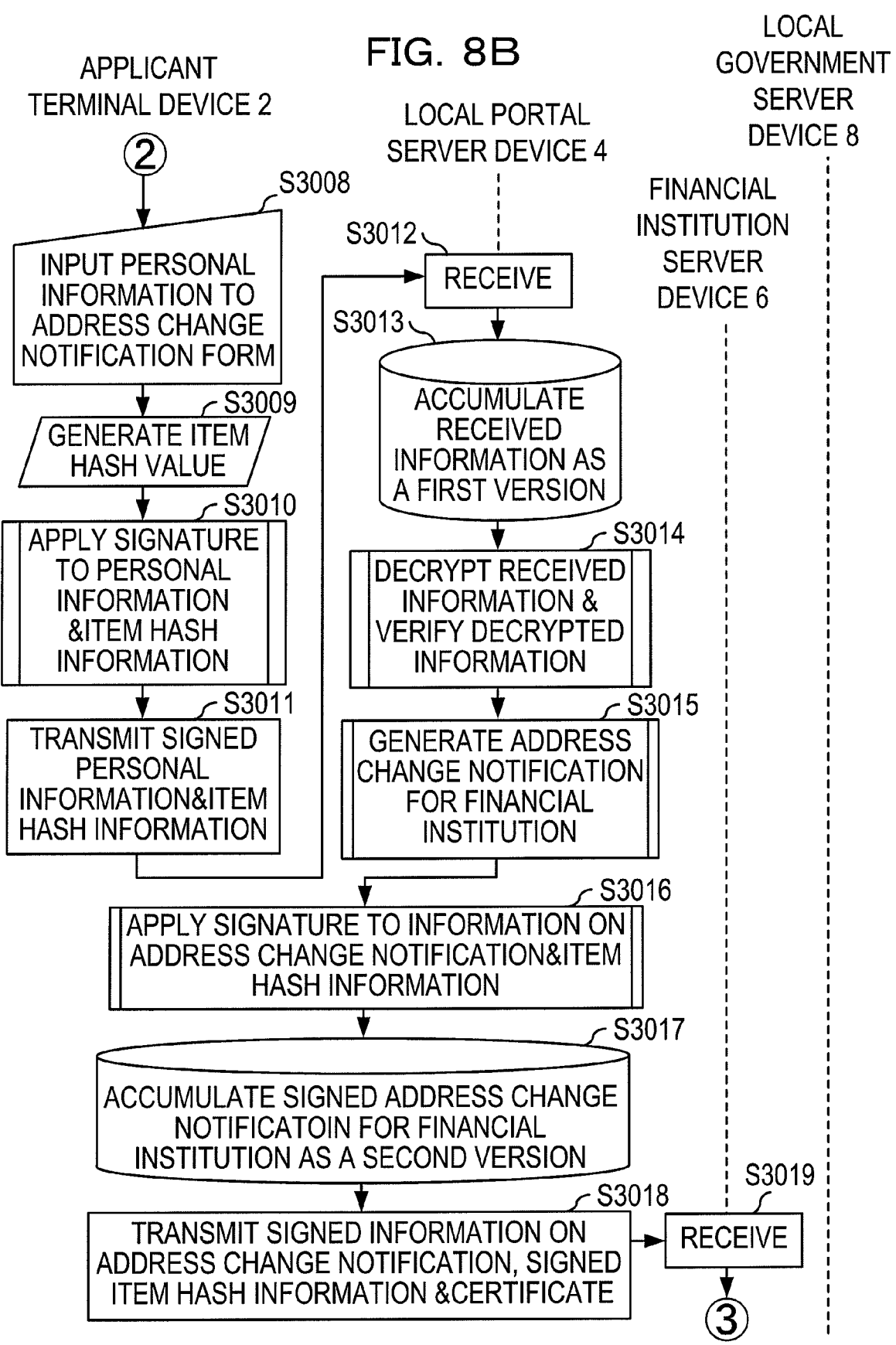
FIG. 8B is a flow chart indicating processing of an address change notification of the embodiment (2 of 5)

Now, return to the flow chart of FIG. 8B. Upon completing the processing, the document management TB 44 instructs a signature generation unit 45 to apply digital signature of the local portal server device 4 to the information on address change notification modified at S4001 and the Hash information acquired at S4002 (S3016), and accumulates such information in pairs as a second version (S3017). The second version of address change notification after this processing is shown in FIG. 11.

As explained above, in the second version of address change notification, an application ID has been added by the local portal server device 4 to the personal information of the first version of address change notification sent from the applicant terminal device 2 shown in FIG. 9. A digital signature of the server device 4 is applied to the personal information.

As a result of the above addition of ID, Hash information of the application ID is added to the acquired information as shown in FIG. 11(b) (item Hash information of address change notification for the financial institution). The same Hash information as that of the first version is acquired for other items. A digital signature of the local portal server device 4 is applied to the personal information as well.

Upon completion of the above processing, the document management TB 44 of the local portal server device 4 transmits the following three pieces of information (digital signatures are applied to the three pieces of information) and two public key certificates in pairs as shown in FIG. 12. Such three pieces of information are the second version of address change notification information (a), the first version of item Hash information (c), and the second version of item Hash information (b), while the two public keys are the applicant's public key certificate (d) and the local portal's public key certificate (e) (S3018). Digital signatures are applied to the three information items (a), (b), and (c) respectively. This Step 3018 constitutes an application submission unit of this disclosure.

More specifically, the following items (a) and (b), and (c) are transmitted in pairs to the financial institution server device 6: personal information (a) and item Hash information (b) both of which are added and applied as a digital signature at the local portal server device 4, and item Hash information (c) before the addition by the local portal server device 4 and to which an applicant's digital signature is applied.

The second version of address change information (a) constitutes the second version of information data, whereas the first version of item Hash information (a) and the second version of item Hash information (b) constitute the second version of information data for verification.

Figure 8C:
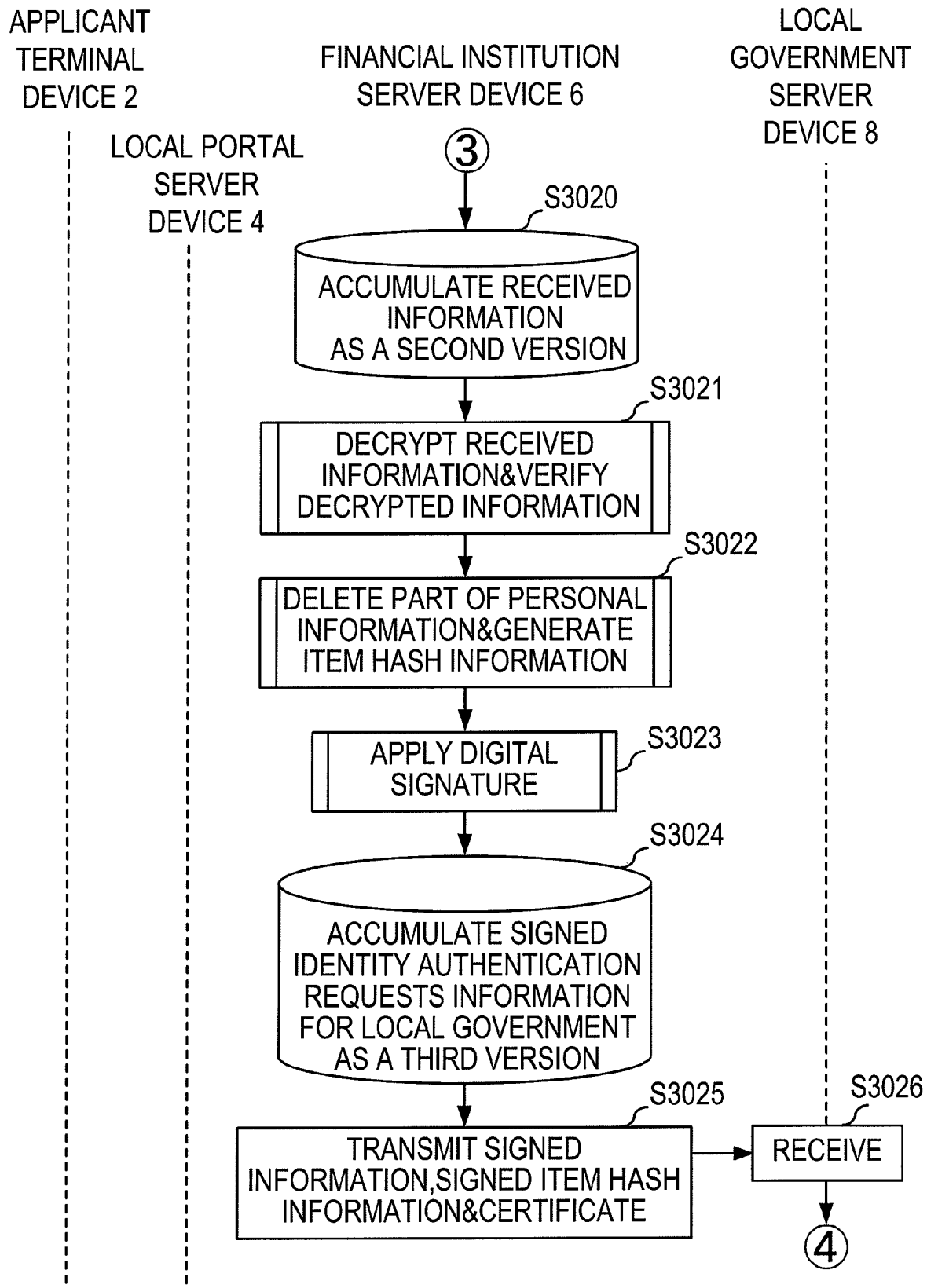
FIG. 8C is a flow chart indicating processing of an address change notification of the embodiment (3 of 5)

When a document management TB62 of the financial institution server device 6 receives this information via a communication unit 65 (S3019), it accumulates the information in a document management DB61 (FIG. 8C: S3020).

Then, a document management TB62 requests for verification of the second version of address change information and item Hash information to a signature verification unit 64.

In response to the request, the signature verification unit 64 verifies digital signatures of the applicant and the local portal according to above authentication processing of digital signature. If the verification revealed the signatures are valid, the unit 64 generates Hash information of the acquired second version of address change notification, and verifies whether this information and the second version of item Hash information differ or not.

Moreover, the decrypted first version of item Hash information and the second version of item Hash information are compared and the following is confirmed (S3021):
(1) The local portal added Hash information of application ID to the first version of item Hash information.
(2) Hash information of other items have not been changed between the first version and the second version of item Hash information ("name" and "address" are written by the applicant and no change has been applied).
(3) No other items other than above are added.
The reason why these are confirmed is as follows.

As mentioned above, the local portal server device 4 transmits the three pieces of information (the first version of item Hash information, the second version of personal information (the second version of information data: the second version of address change notification information and the second version of item Hash information). However, the local portal server device 4 may intentionally change the pair of the second version of personal information and the second version of item Hash information because the server device 4 applies digital signatures to both of them.

In order to check for this intentional change, the following is verified by using characteristics of Hash information such that the information is almost uniquely defined for a value. Whether the second version of address change notification information and the item Hash information are the valid pair or not is verified by comparing Hash information acquired for each item of the second version of address change notification information and the item Hash information of transmitted second version and verifying whether or not the two are identical.

Moreover, the first version i.e., item Hash information to which applicant's digital signature is applied, and the second version of item Hash information are compared based on the assumption that this verification has been performed. Then the item added by the portal server device 4 during communication and items input by the applicant can be proved to the financial institution, and the address change notification information can be accepted as valid information from the applicant.

When the signature verification unit 64 verifies the validity of the information at S3021, the document management TB 62 deletes a part of the second version of address change notification information in order to create certification request information (S3022).

More specifically, information required for an identity authentication (a certification request) is basically applicant's "name", "address", and digital signature. Information on the correspondent financial institution, i.e., "bank name" and "account number" is private information and the disclosure must be prevented as much as possible. Financial institutions generally withhold the information in view of information protection. In this embodiment, the financial institution partially deletes information on correspondent financial institution (in this embodiment, "bank name" and "account number") (S3022).

The methods of the partial deletion include, describing "xxxx is deleted" or "xxxxxxx". The former example ("xxxx is deleted") can clearly indicate that the financial institution deleted the information. Thus employing this method is desirable.

Next, item Hash information of this modified personal information is generated (S3022). If the signature verification unit 64 at S3021 did not verify validity, the document management TB62 transmits the error notification to the financial institution terminal device 7. The terminal device 7 notifies the error to the person in charge in the financial institution, for example, by displaying the error information and processing is interrupted.

Then, the document management TB62 instructs the signature generation unit 64 to apply the digital signature of the financial institution for the partially deleted personal information and the generated item Hash information at (S3023).

Upon completion of the processing of S3023, the document management TB 62 accumulates personal information to which a digital signature of the financial institution has been applied at the S3023 and item Hash information as the third version of identity authentication request information (certification request information) to the DB61 (S3024).

FIG. 13 shows the third version of identity authentication request information (certification request information) generated after executing the above process. In the address change notification information (application processing information) transmitted from the local portal server device 4 shown in FIG. 13 (compared with the second version shown in FIG. 11), a part of the personal information is deleted and the corresponding item Hash information is changed. Other items (both personal information and item Hash information) are the same as those of the second version of address change notification information.

Digital signatures of the financial institution are applied to the third version of this personal information and the item Hash information respectively. Upon completion of this accumulation, as shown in FIG. 14, the communication unit 65 of the financial institution server device 6 is controlled to transmit four information items and three public key certificates to the local government server device 8 in pairs (S3025). Such four information items are the third version of identity authentication request information (a: the third version of information data), the first version of item Hash information (d), the second version of item Hash information (c), and the third version of item Hash information (b) accumulated in the document management DB 61 and public key certificates of the applicant (e), that of the local portal (f), and that of the financial institution (g). The first version of item Hash information (d), the second version of item Hash information (c), and the third version of item Hash information (b) constitute the third version of identity authentication request information.

When a document management TB82 of the local government server device 8 receives this third version of identity authentication request information transmitted by the financial institution server device 6, the local government server device 8 accumulates the information in a document management DB81 (FIG. 8D: S3027).

Then, the document management TB82 requests verification of the third version of identity authentication request information and item Hash information from a signature verification unit 84.

In response to the request, the signature verification unit 84 verifies digital signatures of the applicant, the local portal, and the financial institution according to the above authentication processing of digital signatures. If the verification revealed the signatures are valid, the unit 84 generates Hash information of the acquired third version of identity authentication request information, and verifies whether this information and the third version of item Hash information differ or not.

Moreover, the decrypted first version of item Hash information, the second version of item Hash information, and the third version of item Hash information are compared and the following items are verified (S3028):

(1) The local portal server device added Hash information of application ID to the first version of item Hash information.
(2) The financial institution deleted information on the applicant's correspondent financial institution ("bank name", and "account number"), and changed the Hash information of the second version of item Hash information as well.
(3) Hash information of other items have not been changed among the first version, the second version, and the third version of item Hash information ("name" and "address" are written by the applicant and no change has been applied).
(4) No other item other than above is added.

When the above processing verifies validity, the document management TB82 transmits the third version of item Hash information with a digital signature of the financial institution applied to the local portal server device 4 (S3029). If the verification processing by the signature verification unit 84 could not verify the validity, the document management TB82 transmits the error notification to the local government terminal device 9. The local government terminal device 9 notifies the error to the person in charge in the local government, for example, by displaying the error information and interrupts the processing.

In S3029, inquiry is made to the local portal server device 4 to confirm whether the financial institution improperly confirms residence of the applicant.

When the document management TB44 of the local portal server device 4 receives the third version of item Hash information to which a digital signature of the financial institution has been applied from the local government server device 8 via the communication unit 48, it accumulates the third version of item Hash information to the document management DB42 (S3031).

The document management TB44 requests verification processing of the third version of item Hash information from the signature verification unit 46. In response to the request, the signature verification unit 46 verifies the digital signature of the financial institution according to the above authentication processing of digital signature. If the verification reveals that the signature is valid, the first and the second versions of item Hash information accumulated by the document management DB42 are taken out and verified (S3032).

It is desirable that digital signatures of the first and the second versions of item Hash information be reapplied according to the above authentication processing of digital signature.

In the verification at S3032, "name" and "address" are the same throughout all versions (i.e., "name" =ABC12, "address"=DEF34), and have not been changed from the first version of item Hash information. Therefore the local portal server device 4 can confirm that the signature was applied by the applicant.

If the verification verified the validity, then item Hash information of application ID recorded in the third item Hash information and that of the second version are compared to confirm that the two are the same (S3033).

As a result of the above comparison, the following can be confirmed. Both versions of item Hash information of application ID are confirmed to be the "MNO90", and whether the address change notification has been partly changed by way of the communication is also confirmed. Moreover, the identity authentication verification TB 47 is referred to and search is performed by using the application ID="00005" as the key.

The application ID may be acquired from the first version of the address change notification information.

If no entry is found, it means that no identity authentication has been performed yet. Thus, entries of "applicant", "application ID", "private company information", and "remarks" are added (updated) to the identity authentication verification TB 47 (S3034). This step S3034 constitutes the application ID database creation unit of this disclosure. A database of verification result is created based on the verification result, and the verified data of application information is stored as verification history data by linking the data to the application ID. At the same time, the identity authentication verification result is transmitted to the local government server device 8 (S3035).

In this case, no entry has been made. Thus, a message indicating that residence may be confirmed is transmitted. If this identity authentication verification revealed that the entry had already been made, a plurality of improper residence confirmations may have been made. In that case, the document management TB44 transmits the error notification to the local portal terminal device 5. Then the local portal terminal device 5 notifies the error to the person in charge in the local portal, for example, by displaying the error information and interrupts the processing.

The document management TB82 of the local government server device 8 receives the result of identity authentication verification transmitted by the local portal server device 4 at S3035 via a communication unit 86. If the TB 82 judges that the residence confirmation may be made, it searches the resident registration DB 85 by using "name" and "address" of the third version of identity authentication request as the key, and confirms that resident registration has been made by the address (FIG. 8E: S3037). The S3035 constitutes the application ID verification unit.

When validity is verified by the residence confirmation processing at S3037, the document management TB 82 then adds the verification information to the identity authentication request information. More specifically, a "certificate" item is added, with the information such as "resident registration has already been made". Moreover, item Hash information of the added item of personal information is generated (S3038). If the residence confirmation processing of S3037 could not verify the validity, the document management TB82 transmits the error to the local government terminal device 9, notifies the error to the person in charge in the local government, for example, by displaying the error information to the local portal terminal device 9 and interrupting the processing.

Then the document management TB 82 instructs the signature generation unit 84 to perform digital signature processing at the local government, for the personal information added and item Hash information generated at S3038 (S3039).

Upon completion of the processing of S3039, the document management TB 82 accumulates the personal information to which a digital signature of the local government has been applied and item Hash information at S3039, as the fourth version of identity authentication verification information (the fourth version of information data corresponding to verification data) in the document management DB81 (S3040).

The fourth version of identity authentication verification information generated after above processing is shown in FIG. 16. As compared with the third version, where identity authentication verification is transmitted from the financial institution as shown in FIG. 13, the verification information is added and the Hash information is recorded for the added information in the item Hash information. As for other items, both personal information and item Hash information have not been changed from the third version of identity authentication verification request information.

Digital signatures of the local government are applied to the fourth version of this personal information and item Hash information. Upon completion of this accumulation, as shown in FIG. 17, the communication unit 86 of the local government server device 8 is controlled to transmit the following five pieces of information stored in the document management DB 81, each paired with a public key certificate of the local government (f) to the financial institution server device 8 (S3041). The five pieces of information are the fourth version of identity authentication verification information (a), the first version of item Hash information (e), the second version of item Hash information (d), the third version of item Hash information (c), and the fourth version of item Hash information (b). The first version of item Hash information (e), the second version of item Hash information (d), the third version of item Hash information (c), and the fourth version of item Hash information (b) constitute the fourth version of data for verification.

The document management TB 62 of the financial institution server device 6 which received the above information via a communication unit 65 accumulates the information in the document management DB61 (S3043). The document management TB 62 instructs the signature verification unit 64 to verify the information.

In response to the request, the signature verification unit 64 verifies the digital signature of the local government according to above authentication processing of the digital signature. If the verification confirmed that the signature is valid, the first, the second, and the third versions of item Hash information accumulated in the document management DB 61 are taken out and verified (S3044).

It is desirable that digital signatures of the first, the second, and the third versions of item Hash information should be reapplied according to above authentication processing of digital signatures.

If the verification confirms validity, Hash information of the acquired fourth version of identity authentication verification information is generated, and whether this information and the fourth version of item Hash information differ or not is verified. Moreover, the first, the second and the third versions of item Hash information taken out from the DB61 are compared and the following verification is performed (S3044). It confirms:

(1) That the local portal added Hash information of the application ID to the first version of item Hash information.
(2) That the financial institution deleted information on the correspondent financial institution of the applicant ("bank name" and "account number"), and changed the Hash information as well.
(3) That the local government added Hash information of verification information indicating the applicant has been registered as the resident to the third version of item Hash information.
(4) That hash information of other items have not been changed among the first, the second, the third and the fourth versions of item Hash information ("name" and "address" are written by the applicant and no change has been applied).
(5) That no other items other than the above have been added.

If the verification revealed the validity, the financial institution processes the address change notification from the applicant (S3045).

The Second Embodiment

As mentioned above, in the first embodiment, the following communication path is assumed: applicant -> local portal server device 4 -> a financial institution server device 6 -> local government server device 8 -> local portal server device 4 -> local government server device 8 -> financial institution server device 6. In the first embodiment, the financial institution server device 6 directly confirms identity authentication to the local government server device 8. This configuration allows the local portal server device 4 to collectively mediate and process all requests, transmitting and storing applications, notifications, certificate data and item Hash information.

In this case, applications, notifications, certificate data and item Hash information are distributed on the communication path just described. These data and information are collectively managed by the local portal server device 4.

Now the second embodiment will be explained by referring to the FIGs of the first embodiment. The local portal server device 4 receives the following information as application information for an address change notification, which is predetermined information of the resident, from an applicant terminal device 2. Such information is the first version of information data shown in FIG. 9(*a*), and the first version of data for verification (FIG. 9(*b*)) for verifying the information. The two pieces of information constitute a first version of related information.

Subsequently, the local portal server device 4 stores the information in a database (a document management DB 42). Then the server device 4 creates a second version of information data by adding an application ID to the first version of information data, and a second version of data for verification for verifying the second version of information data as the second version of related information, and stores the information in the database (the document management DB 42) and transmits the information together with the first version of data for verification (FIG. 9(*b*)) to an institute server device (a financial institution server device 6).

For instance, the financial institution server device 6 transmits a third version of related information to the local portal server device 4. The third version of related information includes the third version of information data (FIG. 14(*a*)) obtained by deleting or changing predetermined items other than application ID, and a third version of data for verification (FIGS. 14(*b*) to (*d*), or only (*b*) may be acceptable).

The local portal server device 4 which received the above information verifies the validity by using the third version of related information and the stored first and second versions of related information. Then, the server device 4 creates a fourth version of information data based on the third version of related information, and the fourth version of data for verification data as the fourth version of related information (e.g., for the third version of related information shown in FIG. 14, the digital signature of the financial institution server device is replaced with that of the portal server device). Subsequently, the server device 4 stores the fourth version of related information in the database and transmits the information to the local government server device 8.

The local government server device 8 creates and transmits a fifth version of information data which is a response to the fourth version of related information as shown in FIGS. 17(*a*) and (*b*), and a fifth version of data for verification as a fifth version of related information, to the local portal server device 4.

The local portal server device 4 verifies the validity by using the first to the fifth versions of related information. Then the server device 4 creates a sixth version of information data based on the fifth version of related information, and a sixth version of data for verification as a sixth related information (e.g., information that the portal server device reapplied a digital signature to the fifth version of related information). Subsequently, the server device 4 stores the information in the database and transmits the information to the financial institution server device 6.

At this time, the local portal server device 4 obtains the identity authentication information shown in FIG. 16. Then the server device 4 creates a database for verification results regarding to the application ID, stores the verified data regarding to the first version of related information by linking the information to the application IDs, and manages history information on whether it is verified or not. The financial institution server device 6 processes the address change notification (application processing) based on the first version of information data.

With this second embodiment, in which the processing is performed via the local portal server device 4, a correspondent financial institution of an applicant may be disclosed by transmitting information directly from the financial institution to the local government. Additional explanation of information including the detailed flowchart and method for processing in this embodiment are not needed here. However, the method for creating item Hash information and a certificate are basically the same as above described method, and can support various operations.

In the second embodiment, the local portal server device 4 should issue a residence confirmation request to the local government server device 8 without applying a digital signature of the financial institution, so that information on a correspondent financial institution of an applicant is not disclosed to the local government. Instead, a residence can be confirmed by applying a digital signature of the local portal server device 4. Applying the digital signature of the local portal server device 4 and confirming the residence enables more secure residence confirmation processing, since the local government can confirm that the residence confirmation request is from the local portal server device.

A system may be considered in which no local portal server device 4 is installed, for example, if the device 4 cannot be trusted. In such a system, applications, notifications, certificate data and item Hash information are distributed on the following communication path: applicant -> a financial institution server device 6 -> local government server device 8>financial institution server device 6 -> applicant. In this case, the applicant applies the application ID, and confirms the application ID and the signature of the applicant transmitted from the local government. Thus, the system significantly increases the burden on the applicant.

The applicant's burden should be alleviated as much as possible, and some problems may still remain in terms of usability and one-stop service of local government. The local portal server device 4 is installed to address these problems.

As explained above, according to this embodiment, who (or which terminal device or server device) created or changed which items of personal information can be verified.

Thus, even if the financial institution server device 6 partly deletes personal information along the way, it is possible to identify remaining personal information which has not been changed from the input by the applicant terminal device 2. Therefore, the local government server device 8 can identify the information input by the user of the applicant's terminal device 2 among identity authentication verification request information changed by the financial institution server device 6. Then the server device 8 trusts and accepts the identity authentication verification request information as a valid request.

Verification is performed by using item Hash information of personal information with personal information of each item being hidden. The item Hash information allows identification of items input by the applicant terminal device 2, i.e., which have not been changed from the original input, with the original personal information being hidden. Therefore items of personal information which should not be revealed to companies or agencies can be transmitted to them with such information being hidden.

Moreover, corresponding application and notification information are identified using the application ID applied at the local portal server device 4. Which item of application ID was applied by which server device can be verified as well, so the ID can be reliable. As a result, collation and identification processes are enabled without using information which may be abused, such as a correspondent financial institution. The applicant applying the application ID to the local portal server can later confirm that unnecessary resident confirmation has not been made. In addition to this, one financial institution can be prevented from improperly requesting resident confirmation from the local government.

Furthermore, only item Hash information applied by the financial institution is transmitted when reconfirmation is made to the local portal. An electronic means such as an electronic mail is assumed to be used for this transmission, and even if the communication path is not secure or can not be trusted, the item Hash information is what we call "encrypted information with verification guaranteed". Thus secure verification is guaranteed without transmitting information for verification more than necessary.

In above explained embodiment of the present disclosure, the application processing method can be enabled by storing the steps shown in each of the flow charts as an application processing program, on a computer-readable storage medium. The computer-readable medium of this disclosure includes a compact disk read-only-memory (CD-ROM), a flexible disk, a digital video disk (DVD), a magnet optical disk (MO), and portable storage medium such as an integrated circuit (IC) card, a database which stores the computer program, or other computers and the database or further includes a transmission medium distributable through a network.

The embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on computer-readable media comprising computer-readable recording media. The program/software implementing the embodiments may also be transmitted over transmission communication media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. Further, according to an aspect of the embodiments, any combination of the described features, functions and/or operations can be provided.

What is claimed is:

1. A computer-readable storage medium storing an application processing program that causes an intermediate server device to perform processes, in a system that also includes at least first, second and third computers, said intermediate server being connectable to one of said first computer and said third computer, said second computer processing information data regarding the application processing received from the first computer, and requesting predetermined verification required for the application processing to the third computer via the intermediate server device, said processes comprising:

receiving a first version of related information that includes a first version of information data regarding said application processing, and a first version of data for verification for verifying the first version of information data from said first computer;

storing the received information in a database;

verifying the first version of information data, and creating a second version of related information that includes a second version of information data obtained by applying an application ID to said first version of information data and a second version of data for verifying the second version of information data, and storing said second version of related information in a database;

transmitting the second version of related information data to said second computer;

verifying said application ID based on data for verifying the application ID upon receiving said data for verifying application ID from said third computer, the verified data being a third version of related information that includes a third version of information data and a third version of data for verification regarding certification request information of said application processing from said second computer;

transmitting said verification results to said third computer;

creating a database of verification results regarding said application IDs based on the verification results; and storing the verified data regarding said first related information by linking said first related information to said application ID.

2. The computer-readable storage medium storing the application program of claim 1 wherein the program stores item hash information obtained for each item of information data from the first version to the "n" th version of information data for verifying the "n" th version of said data for verification.

3. The computer-readable storage medium storing the application program of claim 1, wherein the program relates information of each version with a digital signature of a computer that created the version.

4. The computer-readable storage medium of claim 1, wherein
    said intermediate server is a local portal server device,
    said first computer is an applicant terminal device,
    said second computer is a financial institution server device, and
    said third computer is a local government terminal device.

5. An application processing method in which an intermediate server device performs processes and said intermediate server is connectable to one of a first computer and a third computer, and a second computer processes information data of the application processing received from the first computer, and requests predetermined verification required for the application processing to the third computer via the intermediate server device, said processes comprising:

receiving a first version of related information which includes a first version of information data regarding to said application processing, and a first version of data for verifying the first version of information data from said first computer;

storing the received information in a database;

verifying the first version of information data, and creating a second version of related information that includes a second version of information data obtained by applying an application ID to said first version of information data and a second version of data for verifying the second version of information data, and storing the second version of related information in a database;

transmitting the second version of related information data to said second computer;

verifying said application ID based on data for verifying the application ID upon receiving said data for verifying application ID from said third computer that received a third version of related information that includes a third version of information data and a third version of data for verification regarding to a certification request information of said application processing from said second computer;

transmitting said verification results to said third computer;

creating a database of verification results regarding said application IDs based on the verification results; and storing the verified data regarding said first related information by linking said first related information to said application ID.

6. An intermediate server device connectable to one of a first computer and a third computer, and a second computer processes information data of the application processing received from the first computer, and requests predetermined verification required for the application processing to the third computer via the intermediate server device, such intermediate server device comprising;

a receiving unit for receiving a first version of related information that includes a first version of information data regarding to said application processing, and a first version of data for verification for verifying the first version of information data from said first computer;

a storing unit for storing the received information to a database;

a storing unit for storing a second version of related information to a database after verifying the first version of information data, and creating said second version of related information that includes a second version of information data obtained by applying an application ID to said first version of information data and a second version of data for verifying the second version of information data;

a transmitting unit for transmitting the second version of related information data to said second computer;

a verification unit for verifying said application ID based on data for verifying the application ID upon receiving said data for verifying application ID from said third computer which received a third version of related information that includes a third version of information data and a third version of data for verification regarding to a certification request information of said application processing from said second computer;

a transmitting unit for transmitting said verification results to said third computer;

storing unit for storing the verified data regarding to said first related information by linking said first related information to said application ID after creating a database of verification results regarding to application IDs based on the verification results.

* * * * *